(12) United States Patent
Bellville et al.

(10) Patent No.: US 10,169,484 B2
(45) Date of Patent: Jan. 1, 2019

(54) METHODS AND APPARATUS TO MANAGE PROCESS CONTROL SEARCH RESULTS

(75) Inventors: Keith Richard Bellville, Round Rock, TX (US); Bryan Michael Jones, Cedar Park, TX (US); John Mark Caldwell, Austin, TX (US)

(73) Assignee: FISHER-ROSEMOUNT SYSTEMS, INC., Austin, TX (US)

( * ) Notice: Subject to any disclaimer, the term of this patent is extended or adjusted under 35 U.S.C. 154(b) by 1762 days.

(21) Appl. No.: 12/889,068

(22) Filed: Sep. 23, 2010

(65) Prior Publication Data
US 2012/0078869 A1    Mar. 29, 2012

(51) Int. Cl.
*G06F 17/30* (2006.01)

(52) U.S. Cl.
CPC .............................. *G06F 17/30943* (2013.01)

(58) Field of Classification Search
CPC ......... G06F 17/30286; G06F 17/30864; G06F 17/30943; G06F 17/30; G06F 17/30905; G06F 17/30967; G06F 17/30011; G06F 17/30126; G06F 17/30876; G06F 17/30017; G06F 17/30672; G06F 17/30867; G06F 17/30637; G06F 17/2247; G06F 17/227; G06F 11/30; G06F 17/2288; G06F 17/30899; G06Q 30/02; G06Q 30/0241; G02B 26/0858; G02B 26/06
USPC ................................. 707/706, 736, 758, 769
See application file for complete search history.

(56) References Cited

U.S. PATENT DOCUMENTS

| 5,918,233 | A | | 6/1999 | La Chance et al. |
| 6,006,221 | A | * | 12/1999 | Liddy et al. |
| 6,081,774 | A | * | 6/2000 | de Hita et al. ..................... 704/9 |
| 6,226,577 | B1 | * | 5/2001 | Yeo ......................... G01P 1/122 |
| | | | | 340/441 |
| 6,285,966 | B1 | | 9/2001 | Brown et al. |
| 6,665,656 | B1 | * | 12/2003 | Carter ........................... 707/769 |

(Continued)

FOREIGN PATENT DOCUMENTS

| CN | 101218590 | 7/2008 |
| CN | 101334784 | 12/2008 |

(Continued)

OTHER PUBLICATIONS

UK Intellectual Property Office, Search Report issued in GB1115638.7, dated Jan. 9, 2012, 1 page.

(Continued)

*Primary Examiner* — Scott A. Waldron
*Assistant Examiner* — Andalib F Lodhi
(74) *Attorney, Agent, or Firm* — Hanley, Flight and Zimmerman, LLC

(57) ABSTRACT

Example methods and apparatus to manage process control search results are disclosed. A disclosed example method includes receiving a search parameter from a user via an application to view search results associated with the search parameter, determining a display context based on the application, searching a search index for control parameters that match the search parameter to form a set of matched control parameters, wherein the search index includes control parameters that correspond to runtime data generated by a controller within a process control system, and rendering the set of matched control parameters for display via the application as the search results based on the determined display context.

27 Claims, 14 Drawing Sheets

(56) References Cited

U.S. PATENT DOCUMENTS

| | | | |
|---|---|---|---|
| 6,772,228 B1* | 8/2004 | Aragona | G06F 9/465 709/203 |
| 7,047,180 B1 | 5/2006 | Mathews et al. | |
| 7,225,187 B2* | 5/2007 | Dumais et al. | |
| 7,873,622 B1* | 1/2011 | Karls | G06F 17/30864 707/707 |
| 7,925,641 B2* | 4/2011 | Albrecht et al. | 707/711 |
| 8,279,067 B2* | 10/2012 | Berger et al. | 340/572.1 |
| 2001/0032025 A1* | 10/2001 | Lenz et al. | 700/28 |
| 2001/0044738 A1* | 11/2001 | Elkin et al. | 705/8 |
| 2002/0138543 A1* | 9/2002 | Teng et al. | 709/102 |
| 2003/0004952 A1* | 1/2003 | Nixon et al. | 707/10 |
| 2003/0217054 A1* | 11/2003 | Bachman et al. | 707/4 |
| 2004/0054660 A1* | 3/2004 | McCormick | 707/3 |
| 2004/0230594 A1* | 11/2004 | Flam et al. | 707/100 |
| 2005/0108211 A1 | 5/2005 | Karimisetty et al. | |
| 2006/0187713 A1 | 8/2006 | Weetman | |
| 2007/0027913 A1 | 2/2007 | Jensen et al. | |
| 2007/0078824 A1* | 4/2007 | Dorgelo et al. | 707/3 |
| 2007/0108267 A1* | 5/2007 | Jonsson | G07D 3/14 235/379 |
| 2007/0240071 A1* | 10/2007 | Sherrill | G05B 23/0267 715/764 |
| 2008/0222141 A1* | 9/2008 | Morales | G06F 17/30657 |
| 2009/0077055 A1 | 3/2009 | Dillon et al. | |
| 2009/0210386 A1 | 8/2009 | Cahill | |
| 2009/0327257 A1* | 12/2009 | Abouzeid et al. | 707/4 |
| 2010/0070484 A1* | 3/2010 | Kraft et al. | 707/706 |
| 2011/0099500 A1* | 4/2011 | Smith et al. | 715/771 |
| 2011/0245932 A1* | 10/2011 | Schleiss et al. | 700/7 |
| 2012/0072919 A1* | 3/2012 | Salsbery | G06F 1/3203 718/105 |

FOREIGN PATENT DOCUMENTS

| | | |
|---|---|---|
| CN | 101354711 | 1/2009 |
| CN | 1018216688 | 9/2010 |
| JP | H05216935 | 8/1993 |
| JP | H10154056 | 6/1998 |
| JP | 2000020122 | 1/2000 |
| JP | 2002157223 | 5/2002 |
| JP | 2002519746 | 7/2002 |
| JP | 2003058244 | 2/2003 |
| JP | 2007052629 | 3/2007 |
| JP | 2009199597 | 9/2009 |
| JP | 2010086535 | 4/2010 |
| WO | 9967690 | 12/1999 |
| WO | 2007123753 | 11/2007 |
| WO | 2009038947 | 3/2009 |

OTHER PUBLICATIONS

State Intellectual Property Office, "Office Action", issued in connection with Patent Application No. 201110290503.3, dated Mar. 31, 2015 (33 pages, English translation included).

State Intellectual Property Office of China, "2nd Office Action," issued in connection with application No. 201110290503.3 dated Nov. 24, 2015, 9 pages (includes English translation).

Japanese Patent Office, English Translation of "Decision of Refusal," issued in connection with Japanese Patent Application No. 2011-206259, dated May 10, 2016, 2 pages.

Peng Ji, "Software Techniques in Operation Support, Plant Information System", Automation, Nikkan Kogyo Shinbun, Ltd. Mar. 1, 1998, vol. 43, No. 3, p. 50-54, 10 pages (includes English translation).

Japanese Patent Office, "Notification of Reasons for Refusal," issued in connection with Japanese Patent Application No. 2011-206259, dated Jul. 24, 2015, 11 pages. (includes English translation).

Japanese Patent Office, "Report of Reconsideration by Examiner before Appeal," issued in connection with Japanese Patent Application No. 2011-206259, dated Dec. 27, 2016, 2 pages. (includes English translation).

Japanese Patent Office, "Search Report by Registered Searching Organization," issued in connection with Japanese Patent Application No. 2011-206259, dated Jul. 8, 2015, 40 pages (includes English translation).

State Intellectual Property Office of China, English Translation of "Notification of the 3rd Office Action," issued in connection with Chinese Patent Application No. 201110290503.3, dated May 16, 2016, 3 pages.

State Intellectual Property Office of China, English Translation of "First Search," issued in connection with Chinese Patent Application No. 201110290503.3, dated Mar. 18, 2015, 2 pages.

Japanese Patent Office, "Notice of Reasons for Rejection," issued in connection with Japanese Patent Application No. 2011-206259, dated Oct. 10, 2017, 4 pages.

UK Intellecutal Property Office, "Examination Report," issued in connection with Great Britain Patent Application No. GB1115638.7, dated Feb. 6, 2018, 9 pages.

Japanese Patent Office, "Notice of Reasons for Rejection," issued in connection with Japanese Patent Application No. 2016-177581, dated Nov. 30, 2017, 15 pages (includes English translation).

UK Intellectual Property Office, "Examination Report," issued in connection with Patent Application No. GB1115638.7, dated Oct. 26, 2017, 9 pages.

UK Intellectual Property Office, "Examination Report under Section 18(3)," issued in connection with Great Britain Patent Application No. GB1115638.7, dated Jul. 5, 2018, 5 pages.

UK Intellectual Property Office, "Examination Report under Section 18(3)," issued in connection with Great Britain Patent Application No. GB1115638.7, dated Sep. 5, 2018, 9 pages.

* cited by examiner

METHODS AND APPARATUS TO MANAGE PROCESS CONTROL SEARCH RESULTS

FIELD OF THE DISCLOSURE

The present disclosure relates generally to process control systems and, more particularly, to methods and apparatus to manage process control search results.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The controllers receive signals indicative of process measurements made by the field devices, process this information to implement a control routine, and generate control signals that are sent over the buses or other communication lines to the field devices to control the operation of the process. In this manner, the controllers execute and coordinate control strategies or routines using the field devices via the buses and/or other communication links communicatively coupling the field devices.

Information from the field devices and the controllers may be made available to one or more applications (i.e., routines, programs, etc.) as runtime data executed by the operator workstation (e.g., a processor-based system) to enable an operator to perform desired functions with respect to the process. Some of these functions may include viewing the current state of the process (e.g., via a graphical user interface), evaluating the process, modifying the operation of the process (e.g., via a visual object diagram), etc. Many process control systems also include one or more application stations. Typically, these application stations are implemented using a personal computer, workstation, or the like that is communicatively coupled to the controllers, operator workstations, and other systems within the process control system via a local area network (LAN). Each application station may execute one or more strategies, routines, or applications that perform campaign management functions, maintenance management functions, virtual control functions, diagnostic functions, real-time monitoring functions, safety-related functions, configuration functions, etc. within the process control system.

Additionally, the application stations and/or the operator workstations may access process documentation, event information, alarm information, and/or help files that describe various aspects of a process control system. Each of these different types of information may be stored in a separate database. In some instances, search functions may be used by an operator to search a database for a desired document and/or information. However, because the different types of documents are stored at different locations and/or databases within the process control system, an operator may have to search multiple databases for information regarding a topic, field device, and/or type of information.

SUMMARY

Example methods and apparatus to manage process control search results are described. In one example, a method includes receiving a search parameter from a user via an application to view search results associated with the search parameter, determining a display context based on the application, and searching a search index for control parameters that match the search parameter to form a set of matched control parameters, wherein the search index includes control parameters that correspond to runtime data generated by a controller within a process control system. The example method also includes rendering the set of matched control parameters for display via the application as the search results based on the determined display context.

An example apparatus includes a search engine to search a search index for control parameters that match a search parameter received from an application, wherein the search index includes control parameters that correspond to runtime data generated by a controller within a process control system. The example search engine is also to transmit the matching control parameters as search results.

DETAILED DESCRIPTION

Figure 1:
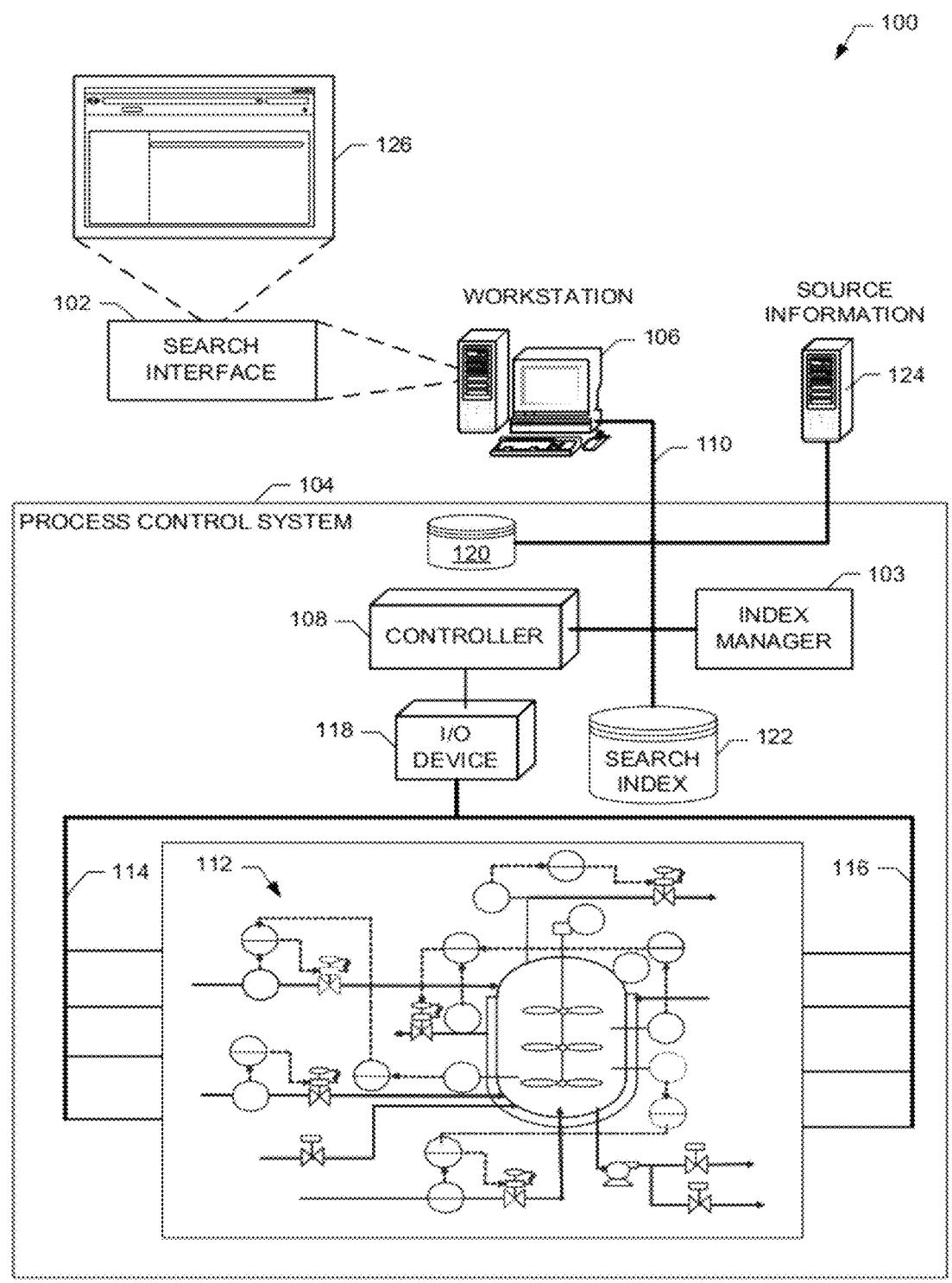
FIG. 1 shows a block diagram illustrating an example process control system including an example search interface and an example index manager.

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus. For example, while the example methods and apparatus are described in connection with managing process control search results, the example methods and apparatus are more generally applicable and may be implemented to manage search results for any automation system, batch processing system, manufacturing system, industrial control system, safety instrumented system, etc.

Process control systems generally include controllers to operate routines, control strategies, and/or algorithms that manage field devices located in the control systems. The field devices may be, for example, valves, valve positioners, switches and transmitters, and may perform process control functions such as opening or closing valves and measuring process control parameters. In addition to managing field devices, controllers generate runtime data based on data received from the field devices. In some examples, controllers may calculate and/or otherwise determine runtime data via routines and/or algorithms based on data received from field devices. The runtime data may include process values, statistics, alarms, monitoring information, process trend information, diagnostic information, field device status information, and/or messages from the field devices.

The controllers transmit runtime data to applications operating on workstations so that operators can manage the process control system. To manage runtime data, known process control systems define control parameters (e.g., control variables) to provide definition(s) of the runtime data. In this manner, an application may reference one or more control parameters in a graphical representation to display the corresponding runtime data. For example, a PUMP01 control parameter may be defined for the output of a pump. A controller receives the output from the pump in the form of values (e.g., data), processes the values in a routine to generate runtime data and stores the runtime data to the PUMP01 control parameter. Graphs, charts, and/or any other graphical representation may display the output values of the pump by referencing the PUMP01 control parameter.

In addition to managing runtime data, process control systems mange source information (e.g., control documentation). Source information describes, for example, aspects of a process control system, field devices instructions, operations of controllers, best practices, historical archived information, troubleshooting procedures, safety practices, application operation instructions, alarm information, event information, and/or help files. The source information and the runtime data are referred to collectively as process control information.

The process control information may be stored in databases local to a process control system. The process control information may also be stored in different databases based on the type of information. For example, safety practice source information may be stored to a safety-related database while field device runtime data may be stored to a device runtime data database. By organizing and storing similar types of documents and information to the same database, process control system designers can optimize and/or conform access and management of the documents to document management guidelines and/or procedures.

To search different databases, a document analyzer (e.g., a crawler and/or a spider) may periodically access the database and index each of the documents based on, for example, key words within the document, a title of the document, and/or other specified parameters within the document. Indexing includes, for example, storing a complete and/or partial version of information to a list that can be searched by a search engine. Indexing saves search time by enabling a search engine to search a single location for information that may be located in many different electronic and/or geographic locations. Using this indexed process control information, a search engine matches search parameters provided by an operator to indexed documents. However, because different types of documents are stored in different locations and/or databases, a user searching for information regarding a particular item that is referenced in multiple databases has to perform a search in each database.

For example, if a user wants documentation regarding a pump, the user may have to access a database with product specifications for the pump, a database with safety procedures for pumps, a database for best practices of pumps, an event database of operation status of pumps, and/or any other database that may include relevant information.

Alternatively, some indexes may include references to multiple databases in a single searchable location. However, many known search engines only return search results as a list of links with some textual description of the links. Additionally, many known search engines configured for local databases display search results as a list of links that match search parameters provided by a user. In some examples, the search results may also include thumbnail pictures of content associated with the provided link. However, the information displayed as search results is generally indexed at periodic intervals (e.g., weekly, monthly, etc.) and may not reflect the most up-to-date information. In process control systems, user, operators, and/or engineers are sometimes required to have the most recent data to evaluate and make decisions regarding the operation of processes and/or field devices.

Many known search engines may not be capable of searching process control runtime data generated from controllers. In many instances, a controller may generate hundreds to thousands of values of runtime data every second. Additionally, values associated with a control parameter may change every few milliseconds, thereby rewriting previously generated data. Because runtime data is generated and/or updated relatively frequently, many known search engines are not configured to index runtime data.

The example methods and apparatus described herein manage and display process control search results by searching an index of source information and/or runtime data (e.g., process control information) that may span different databases in different locations and displaying the search results in a context associated with the search. The index may include complete versions of source information and/or runtime data. Alternatively, an index may include a searchable representative portion of source information and/or runtime data. The context of the search may include a job function of a user performing the search, access levels of the user, an identity of the user, and/or an authentication provided by the user. The context of the search may also be based on a context of an application, a context of a user interface, and/or a context of selected process control information to initiate a search.

Additionally, the example methods and apparatus described herein manage the display of search results by configuring a display of the search results based on a context used to request the search results. For example, a user manually entering search parameters into a search field from an operator interface may receive a list of search results within a preview panel showing portions of a process control system with updated runtime data associated with each search result. In another example, a user may initiate a search by selecting a graphically represented field device on a schematic. In this example, the methods and apparatus may determine search parameters based on the selected field device and return graphical search results associated with the schematic (e.g., layout information, runtime data associated with the field device, historical trend graphs, etc.).

The example methods and apparatus described herein manage an index of runtime data that may not be stored in a database or a document. Because the runtime data is generally dynamic, the methods and apparatus index runtime data by indexing control parameters associated with the runtime data. In many instances, names of control parameters are static. The example methods and apparatus index a list of control parameters that are commonly and/or frequently used within a process control system so that any applications or graphical representations that access the control parameters may be displayed as search results with the most recent runtime data. Thus, the example methods and apparatus effectively index runtime data by indexing control parameters associated with the runtime data and propagating runtime data changes to displayed search results.

The example methods and apparatus described herein may also specify time periods when control parameters and/or runtime data is read from a controller and/or how long the control parameters and/or runtime data is stored within an index. In some instances, the example methods and apparatus may only index control parameters of runtime data as long as the control parameters are relevant and/or accessed relative frequently by users within the control system. In other examples, the methods and apparatus may index all control parameters and only update frequently accessed control parameters.

The example methods and apparatus described herein enable process control users, operators, and/or engineers to save search parameters (e.g., search criteria) and/or search results to a local database. Periodically, the methods and apparatus identify common and/or frequently saved searches and promote these common saved searches to a public database available to other process control personnel. Additionally, the example methods and apparatus described herein manage a back-up index that may be stored on each workstation and/or computer in a process control system. The back-up index may be updated less frequently than the primary process control index but may provide search capability when the primary index is offline.

FIG. 1 shows a block diagram of an example process control environment 100 including an example search interface 102 and an example index manager 103 that may be used to implement the example methods and apparatus described herein. The example search interface 102 and index manager 103 are included within a process control system 104. Additionally, the search interface 102 may be implemented by and/or included within a workstation 106. In other examples, the search interface 102 may be included within a server, a distributed computing network, and/or any other computing device(s) that may be communicatively coupled to the workstation 106.

The example workstation 106 of FIG. 1 may include any computing device such as a personal computer, a laptop, a server, a controller, a personal digital assistant (PDA), a computing pad, a micro computer, etc. The workstation 106 may be implemented using any suitable computer system or processing system (e.g., the processor system P10 of FIG. 12). For example, the workstation 106 could be implemented using a single processor personal computer, single or multi-processor workstations, etc.

The example process control system 104 may include any type of manufacturing facility, process facility, automation facility, safety instrumented facility, and/or any other type of process control structure or system. In some examples, the process control system 104 may include multiple facilities located at different locations within the process control environment 100. Additionally, the example process control environment 100 may include other process control systems (not shown) that may be included within the same facility and/or located at a different facility.

The example process control system 104 includes a controller 108 that is communicatively coupled to the workstation 106 via a local area network (LAN) 110. The LAN 110 may be implemented using any communication medium and/or protocol. For example, the LAN 110 may be based on a hardwired or wireless Ethernet communication scheme. However, any other suitable communication medium and protocol could be used. Furthermore, although a single LAN 110 is shown, more than one LAN and appropriate communication hardware within the workstation 106 may be used to provide redundant communication paths between the workstation 106 and a respective similar workstation (not shown).

Additionally, the process control environment 100 may include routers (not shown) to communicatively couple other workstations (not shown) to the controller 108 and/or to communicatively couple the workstation 106 to controllers (not shown) within other process control systems. Further, the process control environment 100 may include a firewall (not shown) to provide remote workstations (e.g., workstations outside of the process control environment 100) access to resources within the process control environment 100.

The process control system 104 includes field devices 112 (e.g., input and/or output devices). The field devices 112 include any type(s) of process control component(s) capable of receiving inputs, generating outputs, and/or controlling a process. The field devices 112 may include control devices such as, for example, valves, pumps, fans, heaters, coolers, and/or mixers to control a process. Additionally, the field devices 112 may include measurement or monitoring devices such as, for example, temperature sensors, pressure gauges, concentration gauges, fluid level meters, flow meters, and/or vapor sensors to measure portions of a process. The field devices 112 receive instructions from the controller 108 via inputs 114 to execute a specified command and cause a change to the process implemented and/or controlled by the field devices 112. Furthermore, the field devices 112 measure process data, environmental data, and/or input device data and transmit the measured data via outputs 116 to the controller 108. This data may include the values of variables corresponding to a measured output from each field device.

The process control system 104 also includes an I/O device 118 (e.g., one or more I/O cards) to receive data from the field devices 112 and convert the data into communications capable of being processed by the example controller 108. Likewise, the I/O device 118 converts data or communications from the controller 108 into a format capable of being processed by the corresponding field devices 112.

The example controller 108 of FIG. 1 operates one or more control routines (e.g., process control algorithms, functions, and/or instructions) to manage the field devices 112 within the process control system 104. The control routines include, for example, process monitoring applications, alarm management applications, process trending and/or history applications, diagnostic applications, batch processing and/or campaign management applications, statistical applications, streaming video applications, advanced control applications, safety instrumented applications, event applications, etc. The controller 108 calculates and/or determines runtime data from data received from the field devices 112. Additionally, the controller 108 writes and/or associates the runtime data to corresponding control parameters. The controller 108 then transmits the runtime data via the control parameters to the example index manager 103 and/or the workstation 106. Further, the controller

108 may store the runtime data to one or more databases (e.g., a runtime data memory 120) accessible by the workstation 106 and/or other workstations within the process control environment 100. Alternatively, runtime data may be stored within the controller 108 and/or a runtime data cache within the process control system 104. The runtime data transmitted by the controller 108 includes, for example, process control values, data values, alarm information, text, status information, diagnostic information, error messages, parameters, events, and/or device identifiers.

The control parameters are process variable names and/or data fields that are assigned runtime data generated by the controller 108. In some examples, routines of the controller 108 may define control parameters and associate a data value with the corresponding control parameter. For example, a control parameter (e.g., PS PUMP01) may correspond to an output speed of a pump. A value reported by the pump within the field devices 112 is associated by the controller 108 with the PS PUMP01 control parameter. The controller 108 writes the value to the PS PUMP01 control parameter within the runtime data memory 120 and/or may propagate this value to any application, schematic, and/or functional diagram that includes the PS PUMP01 control parameter. In some examples, the pump (like many of the field devices 112) may transmit new output values a few times a second, thereby changing the value stored in association with the PS PUMP01 control parameter.

The example index manager 103 manages an index of runtime data by periodically accessing the runtime data memory 120 and indexing the runtime data. In some examples, the index manager 103 may index runtime data by determining which control parameters are relevant and/or frequently accessed by workstations requesting search results. In other examples, the index manager 103 indexes most and/or all of the control parameters listed within the runtime data memory 120. Additionally, the index manager 103 periodically updates the index by reading currently stored runtime data in the runtime data memory 120 and/or runtime data generated by the controller 108 and updating the corresponding control parameters within the index. Alternatively, the index manager 103 may manage links between control parameters listed within an index and the runtime data stored in the runtime data memory 120 and/or generated by the controller 108. In this manner, when a control parameter is displayed within a search result, a link within the index couples the runtime data to the displayed control parameter to show updated runtime data within the context of the control parameter.

The example index manager 103 stores index(es) in a search index database 122. The search index database 122 includes a list of control parameters and associated runtime data indexed by the index manager 103 that is organized in a searchable manner. In some examples, the control parameters within the search index database 122 are organized by, for example, process control area, field device, parameter type, and/or any other process control category.

Additionally, the index manager 103 may receive and/or access a source information database 124 to index source information. The source information database 124 includes at least one database that stores documents, files, and/or process control information within the process control system 104. In some examples where the source information database 124 includes multiple databases, the index manager 103 indexes each of the databases 124 and combines the index information into a single searchable index within the search index database 122. For example, while the source information database 124 is shown as a single database, the source information database 124 may include multiple databases, memories, servers, and/or workstations that may store process control documentation at different locations throughout the process control environment 100. In other examples, the index manager 103 may create an index for each of the databases 124 and store the indexes to the search index database 122. In these other examples, the search interface 102 may consolidate search results from searching the multiple search indexes.

The source information stored within the database(s) 124 may be created by process control users, operators, engineers, managers, designers, etc. to document aspects of the process control system 104. The source information includes, for example, instructional manuals describing operations of the field devices 112, issue troubleshooting documentation, documents describing the processes implemented by the process control system 104, help files, historical archived information, configuration information, best practice documents, safety procedures, etc. The example index manager 103 enables a user of the workstation 106 to perform a single search of the database(s) 124 within the process control environment 100 using a set of search parameters. In this manner, a user may relatively quickly and efficiently locate substantially all relevant process control documentation and/or data related to search parameters without having to perform separate searches of databases for different types of documents and/or files.

The example search index database 122 is accessible to the workstation 106 (and other workstations in the process control system 104) via the LAN 110. The workstation 106 uses the search interface 102 to search for control parameters and source information indexed by the index manager 103 within the search index database 122. In other examples, the index manager 103 stores a local copy of a search index within the workstation 106. The local copy of the search index may be used by the workstation 106 to locate process control information stored within the source information database 124 and/or the runtime data memory 120 when the search index database 122 is offline and/or not accessible.

To provide context-based searches from a process control application, the example process control system 104 includes a user interface 126. The example user interface 126 may be any application interface that enables a user of the workstation 106 to, for example, view process control information, modify process control information, manage the process control system 104, and/or enter process control information. Applications may include an enterprise view application, a graphics studio application, a control strategy studio, a system configuration explorer application, and/or any other type of process control-based application. These applications display information within the workstation 106 via the one or more user interfaces 126. The user interface 126 may include a graphical window that is displayed within the workstation 106 to show process control information displayed as graphical representation(s) (e.g., functional block diagrams and/or schematics). The workstation 106 may be capable of displaying more than one user interface 126. In some examples, the user interface 126 may include one or more graphical representations of process control information and include one or more fields to enter information. A user may access different applications and/or displays that are shown to the user via the user interface 126.

The search interface 102 of the illustrated example provides a search capability that locates requested process control information and may filter the process control information to display search results that are relevant and/or authorized to be viewed by a user based on a job function of the user, an area of control of a user, and/or an identity of a user. This search capability combined with filtering search results enables the example search interface 102 to provide search results with a relatively reduced effort by a user of the workstation 106. To provide search capability, the example search interface 102 accesses the search index database 122 to match user specified search parameters to indexed process control information. The search interface 102 then displays the matching process control information as search results.

The search interface 102 may display the search results based on the type of process control information. In some examples, search results may be displayed as images of a schematic with runtime data, graphs, charts, document titles, flowcharts, functional diagrams, etc. The search interface 102 may also display search results within a preview panel. In some examples, the preview panel may graphically display a selected search result item (e.g., process control information) prior to a user selecting to access a source document and/or runtime data associated with the listed search result item. The preview panel displays the selected search result item by opening an application supported by the search result item. The application may be embedded within the user interface 126 and/or may initiate a separate user interface for a user to view the selected search result item.

Upon receiving a selection of process control information listed as a search result, the search interface 102 accesses the source information database 124 and/or the runtime data memory 120 to retrieve the selected process control information. The example search interface 102 then displays the selected process control information 102 based on a context of the search and/or a context of the information. For example, a selected schematic is displayed within a schematic view application, a document is displayed within a word processing application, and/or runtime data is displayed within graphical runtime data applications.

The search capability provided by the search interface 102 may span multiple databases (e.g., the source database 124) including, for example, a system configuration database, a knowledge management database, an asset management database, an alarm and event database, a batch history database, a help files database, and/or a user supplied document database. The search interface 102 may provide search support for multiple process control systems (not shown) within the process control environment 100 including integrated searches across systems that may be implemented on different platforms. The example search interface 102 may also provide search navigation capability for the workstation 106 by providing information related to previous events, process control history, and/or and previous runtime data.

Additionally, a user of the workstation 106 may search for process control information in context based on selected graphical process control information displayed by the user interface 126. For example, a user may select a tag and search for other graphical representations and/or information that include the same selected tag. In some examples, an in-context search for process control items shown within the interface 126 may not require any text input. In other words, a user may provide a search parameter of an item to the search interface 102 by clicking-on the item displayed within the interface 126. In another example, a user may use a search text box to locate displayed source information and/or runtime data with attributes that match an entered text string (e.g., search parameter). Attributes of the displayed source information and/or runtime data that are part of the search criteria include, for example, a display name, a description, a referenced field device, and/or an assigned display location.

In some examples, the example search interface 102 enables a user to open (e.g., navigate to) any source information and/or runtime data listed within search results by selecting the listed source information and/or runtime data. The search results for source information and/or runtime data may first list source information and/or runtime data within a span of control (highest relevancy) of a user of the workstation 106, followed by source information and/or runtime data associated with other operational areas. Further, the search interface 102 may enable a user to search a particular category (e.g., batch information, alarms and event information, operator notes, field device information, procedures, etc.) of process control information.

A user may utilize a search text box to locate, for example, the field devices 112 with names and/or descriptions that include a search parameter that includes text string. The text string may include all and/or part of the name of the field device 112, including wildcard characters. Further, the example search interface 102 enables a user to navigate to specific field device-related displays including, for example, a general information display of the field device 112, a detailed display of the field device 112, and/or a primary display of the field device 112. For example, a user may search for the field device 112 and then select desired process control information associated with the field device 112 to open and/or view the selected information.

In the example of FIG. 1, a user may use the search interface 102 as part of the user interface 126 to search for field devices using a tag identification value of the field device. The search interface 102 may display search results provided by the index manager 103 by listing results with highest relevancy to (e.g., list first) based on the field devices 112 within areas of a span of control of the user. In some examples, a user may add keywords to some search results that identify the source information and/or the process control information. The search interface 102 receives the keywords from the user interface 126 and indexes the keywords with the corresponding source information and/or process control information. The keywords may enable the search interface 102 to more accurately and/or quickly locate the corresponding indexed source information and/or process control information.

Additionally, the example search interface 102 enables users to search for charts (e.g., runtime data and/or source information) from within an enterprise application and/or a process history application. The search interface 102 enables a user to search for charts in context based on tags selected on currently displayed process control information. For example, a user may select a tag on a process control item shown within the user interface 126 causing the search interface 102 to search for indexed charts that include the same selected tag. A user may also use the search interface 102 to enter a text string into a search text box to locate indexed charts with attributes that match the entered text string. Chart attributes which are part of the search criteria (e.g., search parameters) include, for example, a chart name, a chart description, and/or a name of the field devices 112.

Further, the search interface 102 enables users to search for process-related alarms and events (e.g., runtime data and/or source information). In some examples, the alarms and events may be stored within an event chronicle database (e.g., the source information database 124) and may be viewed in the user interface 126 by a user using an enterprise view application and/or a process history view application.

The example search interface 102 enables a user to search for alarms and/or events in context based on displayed process control information. For example, a user may select a graphical representation of the field devices 112 and display all alarms and/or events, associated with the selected field devices 112 that were recorded during the last 24 hours. A user may also use a search text box to cause the search interface 102 to locate alarms and/or events with attributes that match the entered text string. In some examples, search results provided by the search interface 102 for alarms and/or events can be listed in chronological order with the most recent alarms and/or events listed first. A user may utilize the search interface 102 to filter search results to display records that match specific search criteria. Further, a user may specify which alarm and/or event attributes are displayed in the search results.

The example search interface 102 of the illustrated example also enables user to search for batch events (e.g., runtime data and/or source information) associated with the process control system 104. For example, the search interface 102 enables a user to search from within an enterprise application and/or a batch history application displayed by the user interface 126 for batch events that may be recorded in a batch history database (e.g., the source information database 124). Additionally, the search interface 102 enables a user to search for batch events in context by selecting displayed process control information. For example, a user may select a Batch ID from a displayed batch list (e.g., process control information) to cause the search interface 102 to display batch history events associated with the selected Batch ID. In another example, a user may select a batch step (e.g., process control information) displayed within the user interface 126 causing the search interface to 102 to display batch events associated with the selected step. Further, a user may use a search text box provided by the search interface 102 to locate batch events with attributes that match the entered text string. The example search interface 102 may also enable a user to filter search results based on specific search criteria and/or to specify which batch event attributes are displayed in the search results.

In addition to batch events, the example search interface 102 enables users to search for operator logbook entries (e.g., source information). A user may use the search interface 102 to search for logbook entries in context based on selected process control information. For example, a user may select an equipment module and/or a log entry search category causing the search interface 102 to search for any log entries that reference the equipment name. The example search interface 102 may enable a user to view a logbook entry listed in the search results.

In the illustrated example of FIG. 1, the search interface 102 also enables a user to search for process control informational documents (e.g., source information) including, for example, standard operating procedures, equipment manuals and/or other reference materials. The search interface 102 can search, via the search index database 122, for an index and/or multiple indexes for relevant documents generated by individuals associated with the process control environment 100 and/or third party individuals that provide support and/or equipment for the process control system 104. The search interface 102 enables a user to search for process control information that is indexed from an external system (e.g., external from the process control environment 100). For example, the index manager 103 may determine that the source information database 124 is located external to the process control environment 100 (e.g., in a SharePoint server). If this external source information database 124 is accessible by the process control system 104, the index manager 103 indexes the documents and/or information stored within the database 124. In other examples, the search interface 102 may access an external database to search for process control information and aggregate any search results with search results from the source information database 124 within the process control environment 100. In this manner, the search interface 102 provides a set of search results to a user that includes both internally and externally located process control information.

Additionally, the example search interface 102 enables a user to search for documents in context based on selected displayed process control information within the user interface 126. For example, a user may select a graphical schematic representation of the field devices 112 to cause the search interface 102 to search the search index database 122 for any documents that reference name(s) of the selected field devices 112. The example search interface 102 also enables a user to utilize a search text box to locate documents that include text or include properties that match an entered text string. The search interface 102 further enables a user to search for operator notes and/or other process control notebook entries by selecting in-context process control information displayed within the user interface 126. For example, a user may select a graphical schematic representation of the field devices 112 and/or a search category of notes causing the search interface 102 to search for any notes that reference the field devices 112.

The example search interface 102 of FIG. 1 enables a user (e.g., an engineer and/or a system administrator) to search for configuration information using, for example, a system configuration explorer application, a control strategy studio application, and/or a graphic studio application displayed by the user interface 126. Further, the search interface 102 enables users (e.g., operators and/or maintenance personnel) to search for information (e.g., device configuration information, device audit trail records, and/or device documents) associated with the field devices 112 from, for example, a system configuration explorer application, an enterprise view application, and/or a device manager application. The configuration search results provided by the search interface 102 may be ordered based on a job function and/or job description of a user (e.g., filter conditions).

Further, the example search interface 102 of FIG. 1 may suggest alternate spellings and/or previously entered search entries with same and/or similar spelling within search fields displayed within the user interface 126. The search interface 102 may enable a user to search using, for example, date time bounds, ranges via numeric keywords (e.g., '<,' '>,' '=,' etc.), logical expressions (e.g., AND, OR, NOT, etc.), a search to match all words, a search to match a word and/or phrase, a search to exclude a word and/or a phrase, and/or a search to include and/or exclude search categories (e.g., types) of process control information. Additionally, the example search interface 102 enables a user to search within a set of search results.

Figure 2:
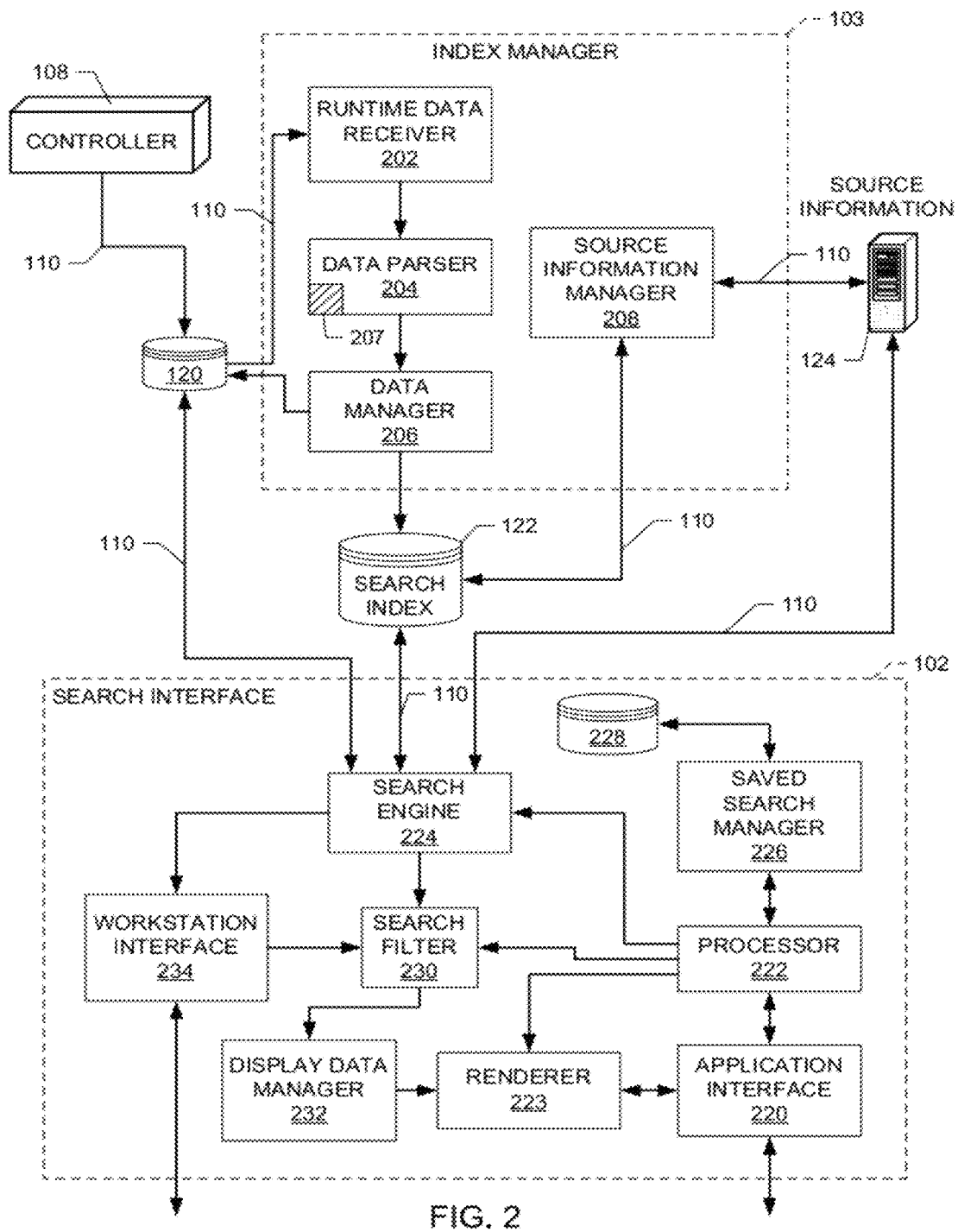
FIG. 2 shows functional block diagrams of the example search interface and the example index manager of FIG. 1.

FIG. 2 shows functional block diagrams of the example search interface 102 and the example index manager 103 of FIG. 1. The example in FIG. 2 shows the search interface 102 and the index manager 103 as being implemented within different processors, servers, and/or computing platforms. In other examples, the search interface 102 and the index manager 103 may be implemented within the same processor, server, and/or computing platform.

To receive runtime data from the runtime data memory 120 and/or the controller 108 of FIG. 1, the example index manager 103 of FIG. 2 includes a runtime data receiver 202.

The example runtime data receiver 202 communicatively couples the index manager 103 to the runtime data memory 120 via the LAN 110. The controller 108 transmits runtime data to the runtime data memory 120 in the form of messages that include control parameter(s) associated with the runtime data. In some instances, the runtime data memory 120 receives a message that includes a single control parameter and the corresponding data value. In other instances, the runtime data memory 120 may receive a message with multiple control parameters and corresponding runtime data. The runtime data memory 120 periodically receives the messages from the controller 108. In other examples, the runtime data memory 120 may receive the messages upon the controller 108 generating and/or processing the runtime data within a control routine and/or algorithm. The runtime data receiver 202 may then request runtime data from the runtime data memory 120.

Upon receiving the runtime data, the receiver 202 determines if a data parser 204 is available to process the runtime data. If the data parser 204 is not available, the receiver 202 queues the runtime data until the data parser 204 is available to receive the runtime data. To determine which of the runtime data is to be indexed, the index manager 103 includes the data parser 204. The example data parser 204 receives runtime data from the receiver 202 and separates the runtime data to be indexed by a data manager 206.

To determine which of the runtime data is to be indexed, the example data parser 204 uses a rule set 207, which may be provided by process control personnel. The data parser 204 uses control parameters specified within the rule set 207 to identify which of the control parameters associated with the received runtime data are to be indexed. For example, the rule set 207 may indicate that a PUMP01 control parameter is to be indexed. Because the data parser 204 receives the runtime data within a message that includes the PUMP01 control parameter, the data parser 204 is able to determine that the PUMP01 control parameter is to be indexed. To index the runtime data associated with the PUMP01 control parameter, the data parser 204 parses the runtime data from the message and forwards the PUMP01 control parameter and the associated runtime data to the data manager 206.

In another example, each control parameter may be associated with an importance factor stored in the rule set 207. The data parser 204 uses the importance factor to determine if runtime data associated with control parameter(s) is to be forwarded to the data manager 206 for indexing. For example, runtime data associated with control parameters having relatively high importance factors may be forwarded by the data parser 204 to the data manager 206. The importance factors may be determined by process control personnel and stored to the rule set 207. Alternatively, importance factors may be determined by the data parser 204 based on how frequently a control parameter is included within a search and/or accessed by a user.

In some examples, process control personnel may decide to index all process control data. In these examples, the data parser 204 forwards all received runtime data to the data manager 206. In other examples, process control personnel may decide to index only process control data associated with field device outputs (e.g., the outputs 116). In these other examples, the process control personnel may define the rule set 207 to include a list of control parameters associated with the field device outputs. The data parser 204 then accesses this rule set 207 to match control parameters associated with the received runtime data to control parameters specified within the rule set 207. The data parser 204 forwards the matching control parameters and associated runtime data to the data manager 206. In yet other examples, the data parser 204 may receive updates from the search interface 102 indicating which control parameters have been included within search results. The data parser 204 then updates the rule set 207 so that only relatively recent searches for control parameters and associated runtime data are indexed. Further, a time limit for indexing recently accessed control parameters may be specified by process control personnel.

To index runtime data, the index manager 103 includes the data manager 206. The example data manager 206 receives runtime data and corresponding control parameter(s) from the data parser 204 and updates search records via an index stored within the search index database 122. Within the runtime data memory 120, the control parameter(s) may be used as descriptors, thereby making the runtime data accessible. To index the runtime data, the data manager 206 identifies the control parameter(s) associated with the runtime data and stores the control parameter(s) to a searchable index stored within the search index database 122. Additionally, the data manager 206 stores the runtime data associated with the stored control parameters to the index. The data manager 206 may use any type of data compression and/or document parsing (e.g., tokenization), which is also sometimes called word boundary disambiguation, tagging, text segmentation, content analysis, text analysis, text mining, concordance generation, speech segmentation, lexing, and/or lexical analysis) to index runtime data and/or corresponding control parameters.

By storing the runtime data and the control parameters to the index, the index manager 103 enables the search interface 102 to display control parameters within search results. The search interface 102 may also display the runtime data stored within the index that corresponds to the displayed control parameters. In this manner, search results displayed by the search interface 102 include indexed runtime data. Because the data manager 206 indexes runtime data as the controller 108 transmits the runtime data, the runtime data displayed as search results is substantially the most recent generated runtime data. Thus, users viewing search results can view the most recent process control information within the search results without having to open another application to individually view the process control information. The example data manager 206 may also overwrite runtime data with relatively more recent runtime data within an index in examples where runtime data is stored to the index. In this manner, the data manager 206 updates the index with the most recent runtime data. The data manager 206 may also transmit a message to the search interface 102 indicating runtime data has changed and/or been updated. As a result, any runtime data that is displayed within search results may be updated with the more recent runtime data as the data manager 206 stores the runtime data to the index.

In other examples, the data manager 206 indexes control parameters searchable within the search index database 122. The data manager 206 may then link those control parameters to corresponding control parameters within the runtime data memory 120. In this manner, search results that include control parameters may use the link to access runtime data for display within the search results. For example, a PUMP01 control parameter within an index within the search index database 122 may include a memory location (e.g., C:\\SYSTEMS\PROCESS02\RUNTIME MEMORY\CACHE2\PUMP01) to the PUMP01 control parameter within the runtime data memory 120. The search interface 102 and/or the user interface 126 uses this memory location to access the PUMP01 control parameter and retrieve the stored value of the runtime data. In this example, the data manager 206 only indexes control parameters while the controller 108 stores runtime data to the runtime data memory 120. As a result of linking to runtime data within the runtime data memory 120, the search interface 102 uses the link to display within search results the runtime data stored within the runtime data memory 120.

In addition to indexing runtime data, the example index manager 103 of FIG. 2 includes a source information manager 208 to index source information. The example source information manager 208 is communicatively coupled to the source information database 124 via the LAN 110 of FIG. 1. The example source information manager 208 indexes the type of source information described in conjunction with FIG. 1 that may be stored on one or more source information database(s) 124 throughout the process control environment 100. In this manner, the source information manager 208 creates at least one searchable index stored within the search index database 122 for source information stored in different locations of the process control environment 100. In other examples, the source information manager 208 may create an index for each of the source information database(s) 124 and/or types of source information based on preferences of process control personnel. In these examples, the source information manager 208 stores the multiple indexes to the search index database 122 so that the search interface 102 only has to access the search index database 122 to perform a search. Further, the source information manager 208 indexes source information periodically (e.g., hourly, daily, weekly, etc.) based on requirements of process control personnel.

The source information manager 208 of FIG. 2 indexes source information using any type of desktop and/or enterprise search algorithm to identify source information within the source information database(s) 124 and stores portions and/or all of the source information to at least one index. In other examples, the source information manager 208 may use a crawler and/or a search spider to identify source information within the source information database(s) 124. The source information manager 208 may use any type of data compression and/or document parsing to index source information. The indexed portions of the source information are displayed by the search interface 102 as search result items. The portions of the source information may include, for example, a title of a document and/or information, key words or phrases associated with and/or embedded within a document and/or information, the field devices 112 and/or control parameter(s) referenced by a document and/or information, authorized viewers of a document and/or information, and/or an area of the process control system 104 associated with the document and/or information. Further, the source information manager 208 may determine a type of document and/or information and store the type to the index. By storing portions and/or complete copies of the source information to an index within the search index database 122, the search interface 102 may match search parameters to the portions of the source information. Further, by storing a type of a document and/or information to an index, the search interface 102 use the type to perform in context based searches for specific types of documents and/or information.

Additionally, the source information manager 208 links the indexed portions of the source information to a location of corresponding source information within the source information database 124. In this manner, the search interface 102 may open source information when a user selects the source information listed within search results. For example, a search result may include a product specification. The search result displays a link to a document (e.g., a search result item). The link includes a title of the product specification and a list of the field devices 112 associated with the product specification (e.g., a portion of the source information). A user may select the document by clicking on the link causing the search interface 102 to access the search index database 122 for the location of the document within the source information database 124. The search interface 102 uses the location of the document to access the document and the type of the document to open an application associated with the type of the document to display the document within the user interface 126.

FIG. 2 also shows a functional block diagram of the search interface 102. The example search interface 102 receives search parameters from a user and provides search results that at least partially match the search parameters. The example search interface 102 also manages saved search results, filters search results based on conditions, and/or manages the display of search results based on a context of a search.

To receive search parameters from a user, the example search interface 102 includes an application interface 220. The example application interface 220 is communicatively coupled to and/or included within the workstation 106 of FIG. 1. The application interface 220 is also communicatively coupled to the user interface 126 of FIG. 1. In some examples, the application interface 220 is operatively coupled to search boxes and/or functions included within the user interface 126. When search parameters are entered into a search box and/or selected via a search function in the user interface 126 by a user, the example application interface 220 receives the search parameters. In some examples, the search parameters may be provided by applications operating within the user interface 126.

Additionally, the application interface 220 receives filter conditions provided by a user via the user interface 126. The filter conditions are used by the search interface 102 to filter and/or parse search results. In some examples, search results may be filtered based on user information and/or areas of the process control system 104 accessible to a user. Filter conditions may also include a job function of a user, a span of control associated with a user, security access of a user, privileges granted to a user, and/or an identifier associated with a user. The filter conditions received by the application interface 220 ensure that a user may not view information that is not relevant to the user and/or that a user is not authorized to view. Upon receiving search parameters and/or filter conditions from the user interface 126 and/or applications displayed by the user interface 126, the example application interface 220 forwards the search parameters and/or the filter conditions to a processor 222. In some examples, the application interface 220 may queue search parameters and/or filter conditions until the processor 222 is available to receive the search parameters and/or filter conditions.

The search parameters received by the application interface 220 include, for example, text and/or context information. Text may include words or phrases entered by a user into a search field (e.g., text box) of the user interface 126, identifiers (e.g., tags) of the field devices 112, operator and/or user information, date ranges, and/or any other information a user may specify to search for process control information. Context information may be generated by a user selecting graphical representations of process control information displayed within the user interface 126. For example, a user may search for process control information associated with a selected graphical representation of a VALVE01 field device displayed within a schematic of the field devices 112. In this example, in-context information received by the application interface 220 may include a search parameter with the name of the VALVE01 field device and a search parameter indicating that the selection of the VALVE01 field device was in a schematic application. A search parameter may also include in-context information indicating the user selected to view search results of documents associated with the VALVE01 field device. Based on these search parameters received by the application interface 220, the search interface 102 may focus a search of the search index database 122 on documents associated with the VALVE01 field device and/or documents associated with the schematic.

In another example, a user may select a function block in a functional block diagram. The example application interface 220 may receive search parameters from the user interface 126 indicating the selection occurred in a function block diagram, the name of the functional block, and/or control parameters associated with the functional block. These search parameters may be used by the search interface 102 to search for runtime data associated with the selected control parameters and/or documents describing the functional block. Other examples of in-context based searches are described in conjunction with FIGS. 5-8.

Additionally, because the example application interface 220 communicatively couples the search interface 102 to the user interface 126 and/or applications displayed by the user interface 126, the application interface 220 transmits search results for display within the user interface 126. The search results include, for example, a list of process control information, process control items, and/or portions or indexed process control information. In other examples, the search results include graphical representations of process control information and/or control parameters with corresponding runtime data. The indexed source information and/or runtime data may be displayed graphically as search results by the user interface 126 in a preview panel and/or within a search results panel.

The example processor 222 of the illustrated example determines a display context of in-context information from the received search parameters. The processor 222 determines a display context so that search results can be displayed to a user in a graphical representation that corresponds to a context from which the user initiated a search. The processor 222 determines the display context by, for example, matching a display context to a type of an application from which a search was initiated, a data type selected to be searched from within the application, and/or a data type of control parameters selected to be searched. The processor 222 may also determine the display context based on in-context information included within search parameters, and/or filter conditions.

Upon determining a display context for search results, the processor 222 transmits the determined display context to a renderer 223. The example renderer 223 uses the display context for generating a graphical representation of corresponding search results for display within the user interface 126. The processor 222 also transmits the display context to a search engine 224. The processor 222 transmits the display context in a message and/or instruction. Additionally, the processor 222 transmits search parameters, filter conditions, and/or in-context information to the search engine 224. Additionally, the example processor 222 may transmit alternate spellings and/or provide recently entered search parameters to the application interface 220 for display within a search field in the user interface 126.

In the illustrated example of FIG. 2, the application interface 220 receives an instruction from the user interface 126 to store search criteria (e.g., search parameters) associated with displayed search results. Additionally or alternatively, the application interface 220 may receive an instruction to store search results. The instruction may include an identifier (e.g., a name) assigned by a user to store the search criteria and/or the search results. Upon receiving a search criteria store instruction, the application interface 220 forwards the instruction to the processor 222, which then accesses the search engine 224 for the search results. The processor 222 then forwards the instruction to a saved search manager 226 that stores the search criteria, the search results, and/or the identifier of the search to a search results database 228. The example search results database 228 stores the search criteria and/or the search results under the associated identifier. The example search results database 228 as well as the source information database 124, the search index database 122, and/or the runtime data memory 120 may be implemented by Electronically Erasable Programmable Read-Only Memory (EEPROM), Random Access Memory (RAM), Read-Only Memory (ROM), and/or any other type of memory.

By storing search parameters and/or search results, a user of the workstation 106 may access process control information that is listed within the stored search results. A user may store search criteria to store search parameters used to generate a list of search results. In this manner, a user is able display a previously displayed list of search results by accessing the stored search parameters. For example, a user may store a 'document' search parameter and a 'FIC_101' search parameter as search criteria that corresponds to search results associated with documentation for a FIC_101 field device. To view a list of the documents at a later time, the user accesses the stored search criteria, thereby causing the search engine 224 to conduct a new search based on the stored search parameters. In other examples, a user may store search parameters to conduct a similar search at a later time and determine if there is any newly added and/or updated source information and/or process control information.

A user may also store search results to store a collection of links that are associated with a particular process control item. For example, a user may search for documents associated with a PUMP01 field device. The displayed search results include links to source information within the source information database 124 and runtime data within the runtime data memory. Instead of storing each of the documents and runtime information locally to the workstation 106, the user may store the search results, thereby storing links to the source information and/or runtime data. The user may then access the stored search results instead of performing another search for the same process control information.

The example saved search manager 226 of FIG. 2 also stores a copy of indexes within the search index database 122 to the search results database 228. To save a copy of an index from the search index database 122, the processor 222 receives an instruction from a user of the workstation 106 via the user interface 126. In other examples, the processor 222 may periodically (e.g., hourly, daily, monthly, etc.) access the search index database 122. By accessing the search index database 122, the processor 222 may copy index(es) and forward the copy to the saved search manager 226. The saved search manager 226 then stores the copy to the search results database 228. By storing a copy of index(es), the example saved search manager 226 enables a user to perform searches when the search index database 122 is not accessible. When the search index database 122 is unavailable, the example search engine 224 accesses the copy of the backup index(es) within the search results database 228 via the saved search manager 226.

To perform searches based on search parameters entered by a user of the workstation 106, the search interface 102 of FIG. 2 includes the search engine 224. The example search engine 224 receives one or more search parameters from the processor 222. The search engine also receives display context information associated with the search parameters from the processor 222. The search engine 224 accesses the search index database 122 and matches the search parameters to indexed process control information. The search engine 224 matches the search parameters by determining which of the search parameters are included within an index of process control information. The search engine 224 also matches the search parameters using the display context information as an additional search parameter. For example, if a display context indicates search parameters were generated in a schematic diagram, the search engine 224 searches for indexed process control information associated with schematic diagrams in addition to searching for indexed process control information that match the search parameters.

The example search engine 224 may match search parameters to indexed process control information based on search parameters provided by a user. For example, a user may specify to match search parameters as an entire phrase. In that case, the search engine 224 searches the search index database 122 for indexed process control information that matches the entire phrase. In other examples, search parameters may list words that are to be excluded from a search. The example search engine 224 would then match indexed process control information that does not include the excluded words. The example search engine 224 may also use other search parameters to conduct a search including, for example, numerical expressions and/or logical connectors.

When the search engine 224 matches control parameters to indexed process control information, the search engine 224 stores the matched process control information to a search results list as a search result. The matched process control information includes a link to the corresponding source information within the search information database 124 and/or the runtime data within the runtime data memory 120. The matched process control information may also include the indexed process control information. The search engine 224 adds search results to the search result list until the search engine 224 has completed a search of the index(es) within the search index database 122.

The search engine 224 then determines a percent match value for each of the search results based on a calculation of how well the search parameters match the indexed process control information (e.g., a relevance calculation). The search engine 224 uses the percent match value to rank and/or order the search results so that most relevant search results are displayed first. In other examples, the search engine 224 may display the most accessed search results first and/or may display a combination of the most accessed and the most relevant search results first. In some examples, the search engine 224 ranks and/or orders search results as they are matched. In other examples, the search engine 224 ranks and/or orders search results upon completing a search of the search index database 122.

Upon ranking and/or ordering search results, the search engine 224 transmits the search results to a search filter 230. The example search filter 230 filters (and/or parses) the search results based on filter conditions received from the processor 222. The example filter conditions are associated with a job function of a user, a span of control associated with a user, security access of a user, privileges granted to a user, and/or an identifier associated with a user. The filter conditions are used by the search filer 230 to ensure that a user may not view information that is not relevant to the user and/or that a user is not authorized to view.

For example, a user of the workstation 106 provides an identifier to log into the workstation 106. When the user performs a search, the identifier may be transmitted to the application interface 220 as a search parameter and/or may be embedded within search parameters and/or display context information as metadata. The processor 222 may extract the identifier from metadata and forward the identifier to the search filter 230. The search filter 230 then determines, for example, a zone of control associated with the identifier and/or a job function associated with the identifier. The search filter 230 then removes from the search results any search results that are not associated with the job function and/or zone of control. Further, the search filter 230 may access security credentials to determine which of the search results the identifier may access. The search filter 230 then forwards the search results that have not been removed to a display data manager 232.

The example display data manager 232 manages process control information that is displayed as search results within an application shown by the user interface 126. The display data manager 232 stores to a local cache control parameters associated with runtime data included within the search results and/or stores link(s) to source information included within the search results. The display data manager 232 then forwards the search results to the renderer 223. Further, the display data manager 232 periodically (e.g., every second, minute, five minutes, ten minutes, etc.) accesses the search index database 122 to determine if any of the indexed runtime data and/or source information displayed as search results has changed. If any of the indexed process control information has changed, the display data manager 232 updates the search results with the changed information and transmits the changed information to the renderer 223. In other examples, the display data manager 232 receives a message from the data manager 206 indicating runtime data has changed. In this manner, the display data manager 232 updates displayed search results as process control information changes within the process control system 104. As a result of updating the process control information, the display data manager 232 enables a user to view the most recent process control information within a search result context.

The example display data manager 232 may also access runtime data displayed within search results by accessing the runtime data memory 120. The display data manager 232 may use control parameters associated with the runtime data to locate the runtime data within the runtime data memory 120. If the display data manager 232 determines that at least some of the runtime data has changed, the display data manager 232 updates the corresponding search result(s) and transmits the updated search result(s) to the renderer 223.

Further, the example display data manager 232 may access the source information database 124 to determine if a new revision of source information listed within a search result has been stored. If the display data manager 232 determines that a new revision has been stored and/or that the source information has otherwise changed, the display data manager 232 updates the search results with the changed source information and forwards the changed source information to the renderer 223. The renderer 223 may then update the displayed search results with the changed source information.

Additionally or alternatively, the example display data manager 232 of FIG. 2 sends an instruction to the search engine 224 to determine if any of the runtime data and/or source information displayed within search results has changed. Upon receiving the instruction, the search engine 224 accesses the search index database 122 to determine if any of the indexed process control information has changed. If the indexed process control information has changed, the search engine 224 forwards the changed information to the display data manager 232.

The example renderer 223 creates a displayable version of (e.g., renders) search results received from the display data manager 232. The renderer 223 creates the displayable search results using display context information received from the processor 222 and/or based on a type of the process control information listed within the search results. The renderer 223 uses the display context information to select a display template for the search results. For example, if the display context is associated with a functional block diagram (e.g., the search was initiated from a functional block diagram), the renderer 223 may select a template with an embedded application that can display the search results as functional blocks. In another example, if the renderer 223 receives display context information associated with a field device (e.g., the field device was selected in a schematic or layout of the process control system 104), the renderer 223 may select a template that can display graphical representations of runtime data (e.g., values, charts, graphs, etc.).

The example renderer 223 may also use a type of the process control information included within the search results to determine how to display the search results. For example, the renderer 223 may display process control information associated with a schematic file format listed within search results in an application that can display schematic files. In other examples, the renderer 223 may receive an instruction from a user of the workstation 106 to display the search results as a list. In this manner, the search results are displayed in a context of the listed process control information. In a similar manner, process control information associated with a document file format may be displayed by the renderer 223 in a word processing application.

Alternatively, the renderer 223 may display search results as a list based on display context information and/or based on a type of the search results. For example, if the search results are associated with different types of process control information, the renderer 223 may display the search results as a list. The renderer 223 may also generate a preview panel showing a selected search result in a context of the file type.

Further, the example renderer 223 displays selected process control information in an associated application. For example, a user may select a search result that corresponds to a word processing document stored in the source information database 124. In this example, the example application interface 220 forwards the selection to the processor 222, which accesses the source information database 124 for the selected word processing document using a link within the search result. The processor 222 then transmits the document to the renderer 223. The renderer 223 determines the document is a word processing document, opens a word processing application within the user interface 126, and displays the document within the word processing application. The display data manager 232 may also provide an indication to the user when a changed version of the opened document is stored in the source information database 124.

Further, the renderer 223 may use filter conditions to determine how to display the search results. For example, the renderer 223 may select an operator interface template when an identifier of a user of the workstation 106 is classified as an operator. In a similar manner, the renderer 223 may display the search results in an enterprise application if the identifier is classified as a designer and/or an engineer. The renderer 223 receives the filter condition from the processor 222 and/or the search filter 230. Additional examples of displaying search results based on filter conditions and/or display contexts are described in conjunction with FIGS. 3-8.

The example renderer 223 of the illustrated example transmits the generated displayable search results to the user interface 126. The user interface 126 displays the search results within the workstation 106 viewable by a user. In some examples, a user may select to preview a displayed search result. In these examples, the application interface 220 receives an instruction from the user interface 126 of the selected search result and forwards the instruction to the renderer 223. The example renderer 223 then generates a display for the selected search result based on a type of process control information associated with the search result and/or based on a context type of the displayed search results. In some examples, the renderer 223 may use the indexed process control information included within the search results to display the process control information in a preview panel. In other examples, the renderer 223 may access the source information database 124 and/or the runtime data memory 120 for the corresponding process control information of the selected search result if the indexed process control information included within the search result is insufficient to generate the display. The renderer 223 than transmits the graphical display of the selected search result to the application interface 220 for display within the user interface 126.

In addition to searching the search index database 122, the example search interface 102 of FIG. 2 includes a workstation interface 234 to search other workstations within the process control environment 100 of FIG. 1. The example workstation interface 234 searches other workstations by performing a file and/or folder search of a memory within the workstations. The workstation interface 234 also searches the workstation 106 that includes the user interface 126 that initiated the search. In this manner, a user may search for process control information substantially anywhere within the process control environment 100, including the workstation 106 of the user.

The example workstation interface 234 of the illustrated example receives search parameters from the search engine 224 and searches communicatively coupled workstations for process control information that matches the control parameters. The workstation interface 234 searches for control parameters associated with runtime data and/or source information that matches the search parameters. The workstation interface 234 enables a user to search for process control information that may stored locally in a workstation but which has not yet been stored to the source information database 124 and/or the runtime data memory 120. The workstation interface 234 may also provide the search engine 224 a list of recently accessed search results. The search engine 224 uses the list from the workstation interface 234 to rank and/or order search results based on which of search results have been accessed recently. Additionally or alternatively, the workstation interface 234 may function as an interface for the search engine 224 to search other workstations.

Upon searching other workstations, the example workstation interface 234 of FIG. 2 transmits the matching search results to the search engine 224. The example search engine 224 then incorporates the search results from the workstation interface 234 with the search results from the search index database 122 and/or the search results database 228. Further, the search engine 224 may place an indication adjacent to the search results that are stored on other workstations. A user may view the indication in the search results and know that the corresponding search result is stored on another workstation.

While the example search interface 102 and the index manager 103 have been illustrated in FIG. 2, one or more of the servers, platforms, interfaces, data structures, elements, processes and/or devices illustrated in FIG. 2 may be combined, divided, re-arranged, omitted, eliminated and/or implemented in any way. Further, the example runtime data receiver 202, the example data parser 204, the example data manager 206, the example source information manager 208, the example runtime data memory 120, the example search index database 122, the example source information database 124, the example application interface 220, the example processor 222, the example renderer 223, the example search engine 224, the example saved search manager 226, the example search results database 228, the example search filter 230, the example display data manager 232, the example workstation interface 234, and/or more generally, the example search interface 102 and/or the index manager 103 may be implemented by hardware, software, firmware and/or any combination of hardware, software and/or firmware. Thus, for example, any of the example runtime data receiver 202, the example data parser 204, the example data manager 206, the example source information manager 208, the example runtime data memory 120, the example search index database 122, the example source information database 124, the example application interface 220, the example processor 222, the example renderer 223, the example search engine 224, the example saved search manager 226, the example search results database 228, the example search filter 230, the example display data manager 232, the example workstation interface 234, and/or more generally, the example search interface 102 and/or the index manager 103 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any apparatus claim of this patent is read to cover a purely software and/or firmware implementation, at least one of the example runtime data receiver 202, the example data parser 204, the example data manager 206, the example source information manager 208, the example runtime data memory 120, the example search index database 122, the example source information database 124, the example application interface 220, the example processor 222, the example renderer 223, the example search engine 224, the example saved search manager 226, the example search results database 228, the example search filter 230, the example display data manager 232, and/or the example workstation interface 234 are hereby expressly defined to include a computer readable medium such as a memory, DVD, CD, etc. storing the software and/or firmware. Further still, the example search interface 102 and/or the example index manager 103 may include one or more elements, processes and/or devices in addition to, or instead of, those illustrated in FIG. 2, and/or may include more than one of any or all of the illustrated elements, processes and devices.

Figure 3:
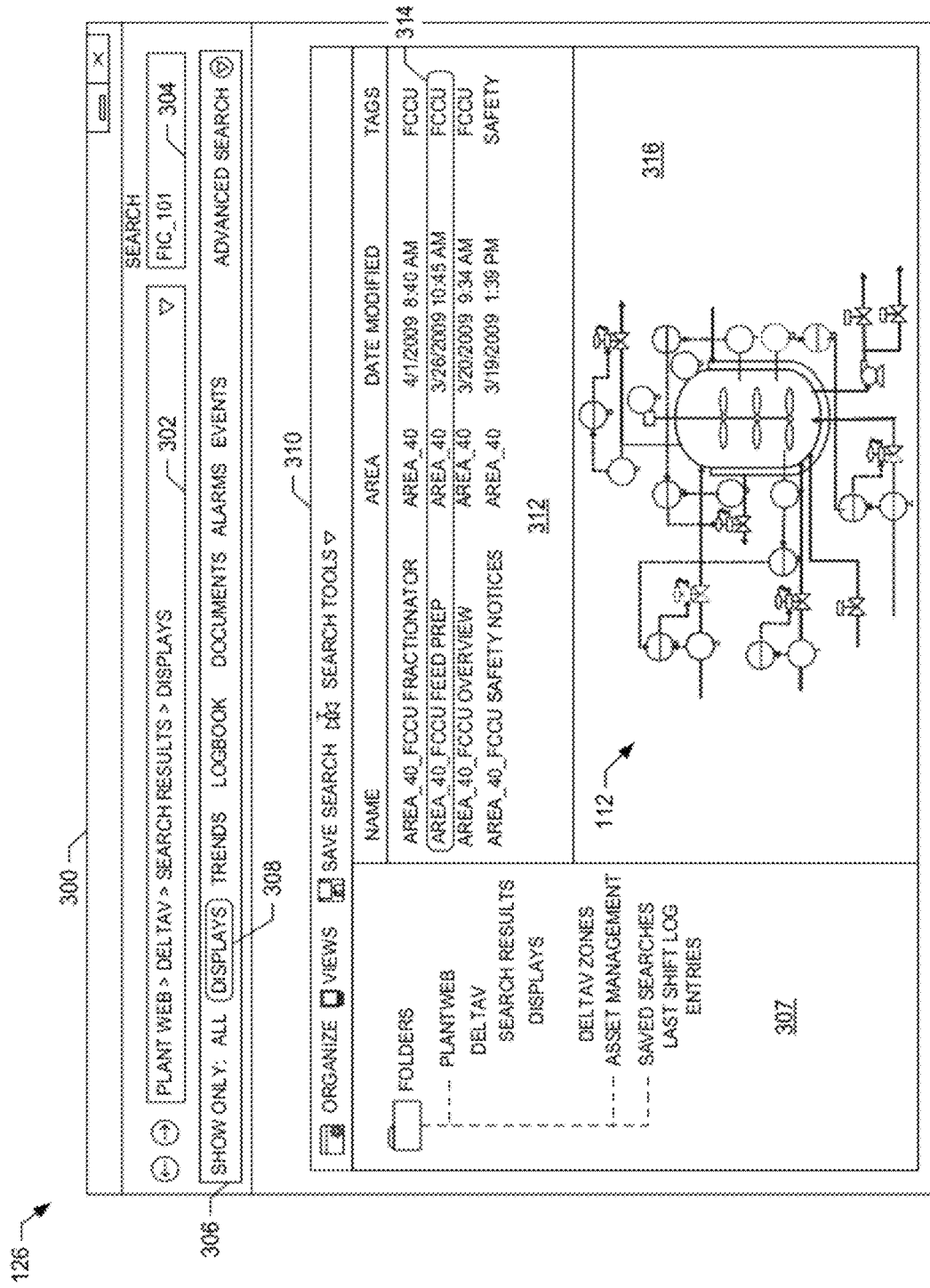
FIGS. 3 and 4 show the example user interface of FIG. 1 displaying search results provided by the example search interface of FIGS. 1 and 2.

FIG. 3 shows the example user interface 126 displaying search results managed by the example search interface of FIGS. 1 and 2. The example user interface 126 displays an application 300 that includes a navigation bar 302, a search text field 304, and a search category bar 306. The example application 300 may be, for example, an enterprise application that enables a user to view process control information associated with the process control system 104 of FIG. 1. The navigation bar 302 shows a location within a file directory of process control information displayed by the application 300. A user may browse to a directory location using a folder panel 307 and/or enter a file directory location into the navigation bar 302. In this example, a Plant Web/ DeltaV/Search Results/Displays directory location is selected by a user via the folder panel 307. In other examples, the navigation bar 302 may show a location within a logical control hierarchy (e.g., an S88 hierarchy).

The example search text field 304 enables a user to enter search parameters that are used by the search interface 102 of FIGS. 1 and 2 to search for process control information. In the example of FIG. 3, a FIC_101 search parameter is entered into the search text field 304. In other examples, a user may enter conditional expressions and/or numerical ranges into the search text field 304. Additionally, a user may enter a type and/or category of a search parameter with text describing a name of the search parameter. For example, a user may enter a search category of 'block type=PID' and a block name of 'block name=FIC_101.' Each of these search parameters are used by the search interface 102 to search the search index database 122 for indexed process control information that includes a block type of PID and a block name of FIC_101. The search text field 304 may also support a user entering wildcard values (e.g., FIC*) and/or may auto fill text based on what a user has started to enter. Further, the search text field 304 may show a user recent text entered for previous searches.

The example search category bar 306 includes selectable search parameters that the search interface 102 may use in conjunction with the FIC_101 search parameter to locate matching process control information. In this example, a Displays search parameter 308 is selected. By selecting the Displays search parameter 308, the search engine 224 of FIG. 2 searches for process control information associated with a display type of graphical representation. In other examples, a selection of the Trends search parameter causes the search engine 224 to search for process control information associated with process trends and/or history including, for example, runtime data, graphs, and/or charts. A selection of the Documents search parameter causes the search engine 224 to search for source information documents that are associated with the FIC_101 search parameter.

The example application 300 of FIG. 3 also includes a tool bar 310 that includes selectable functions to perform on search results displayed within a search results panel 312. For example, a user may select a Save Search tool item to save search results to the search results database 228. The search results panel 312 displays search results generated by the search interface 102. In the illustrated example, the search results panel 312 includes search results that match the FIC_101 search parameter in the search text field 304 and the Displays search parameter 308. In this example, the search results include indexed process control information that includes a Name, an Area within the process control system 104, a Date the process control information was last modified, and a Tag value that corresponds to an identifier of the process control information. The indexed process control information is indexed by the index manager 103 based on source document(s) stored within the source information database 124 and runtime data stored within the runtime data memory 120. In other examples, the search results may include different types of indexed process control information.

Additionally, a user may select which categories of indexed process control information are displayed within the search results panel 312. For example, a user may remove the Area category and/or add a file type category. In some examples, the search interface 102 may determine which categories of indexed process control information to display within the search results panel 312 based on search parameters and/or a type of the indexed process control information.

Further, the search results in the search results panel 312 are filtered based on a filter condition associated with Area_40. In this example, the search interface 102 receives an identifier of a user requesting the search. The search filter 230 uses the identifier as a filter condition to determine a zone of control (e.g., Area_40) associated with the identifier. Based on the identifier filter condition, the search filter 230 transmits only search results associated with the Area_40 zone of control.

The example search results panel 312 also includes a selection indicator 314 showing that a user selected the Area_40_FCCU Feed Prep search result. As a result of selecting the search result, the search interface 102 uses a link within the search result to access runtime data stored in the runtime data memory 120 and/or source information within the source information database 124 associated with the Area_40_FCCU Feed Prep search result and generates a graphical representation in a preview panel 316. The example preview panel 316 shows the field devices 112 in a schematic diagram that corresponds to the Area_40_FCCU Feed Prep search result. In other words, in response to the user selecting the Area_40_FCCU Feed Prep search result, the search interface 102 determines that the Area_40_FCCU Feed Prep search result is associated with a schematic context display based partially on the selection of the Display search parameter 308 and partially on a data type associated with the Area_40_FCCU Feed Prep search result. In some examples, the field devices 112 shown within the preview panel 316 may show runtime data that changes as the controller 108 of FIGS. 1 and 2 calculates the new runtime data.

The search results listed within the search results panel 312 enable a user to select any of the search results to view a schematic graphical representation of the selected search result. In this manner, a user may view different portions of the process control system 104 within the Area_40 relatively quickly by selecting to display the search result within the preview panel 316. A user may then decide to view one of the listed search results within a schematic application to access additional schematic functionality to view and/or modify the selected search result. By selecting one of the search results, the search interface 102 uses the link within the selected search result to access the source information within the source information database 124 and/or runtime data within the runtime data memory 120. The search interface may then initiate a schematic capture application (not shown) with the selected portion of the process control system.

Figure 4:
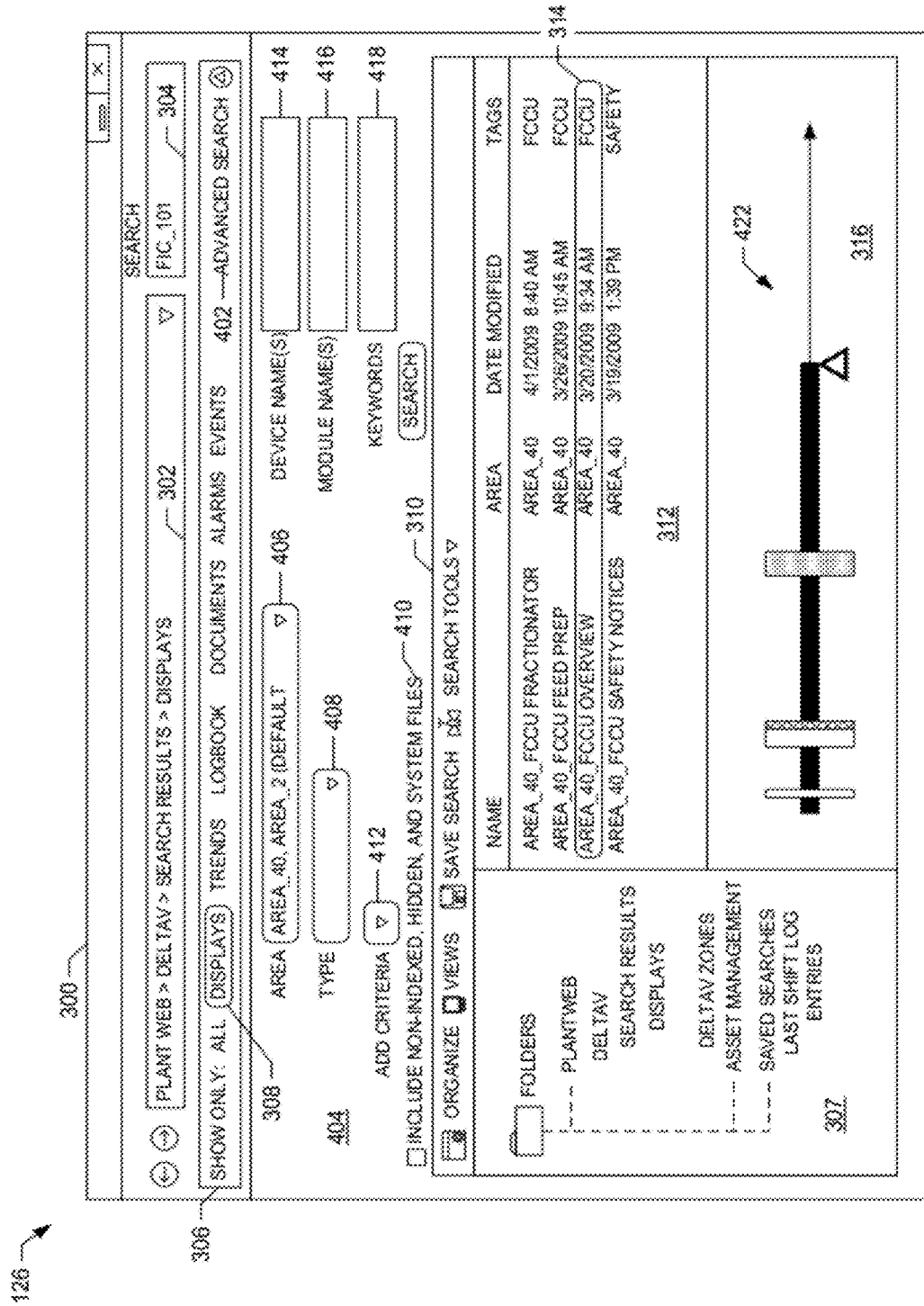

FIG. 4 shows the example user interface 126 of FIG. 1 displaying search results in the application 300 of FIG. 3 provided by the example search interface 102 of FIGS. 1 and 2. The application 300 includes the navigation bar 302, the search text field 304, the search category bar 306, the folder panel 307, the tool bar 310, the search results panel 312, and the preview panel 316 of FIG. 3. Additionally, FIG. 4 shows a user selecting an advanced search button 402 that causes the application 300 to display an advanced search panel 404.

The example advanced search panel 404 enables a user to more accurately and/or more specifically provide search parameters. The advanced search panel 404 of the illustrated example includes an area field 406 that may be used by a user to specify a location within the process control system 104 to conduct a search. In some examples, the area field 406 may default to a span of control to a user. The advanced search panel 404 includes a type field 408 that enables a user to search for process control information associated with a type of document, a type of source information, and/or a type of process control information. Additionally, the advanced search panel 404 includes an inclusion selector 410 that a user may select to instruct the search engine 224 to search other workstations and/or other process control components for process control information that is not indexed within the search index database 122.

The advanced search panel 404 also includes a criteria field 412 that enables a user to select search parameter types to perform a search. In some examples, a user may add and/or remove fields from the advanced search panel 404 using the criteria field 412. In the example of FIG. 4, a user selects search criteria including Device Names, Module Names, Keywords, Area, and Type. In other examples, a user may select criteria including Object Types, Display Names, Description, Date, and/or Author. Because the user selected a Device Names search criteria, the advanced search panel 404 includes a device name field 414 that enables a user to enter a name of a process control field device as a search parameter. Further, because the user selected a Modules Names search parameter, the advanced search panel 404 includes and a module name field 416 that enables a user to enter an identifier of a component and/or module within the process control system 104 as a search parameter. Moreover, the advanced search field 404 includes a keywords field 418 that enables a user to specify text included within process control information and/or metadata associated with process control information as a search parameter. Further, the fields 406, 408, and 412 include an arrow indicating a drop down box that contains selectable search parameters. The fields 406, 408, and 412 include the drop down boxes because the fields 406, 408, and 412 have a limited possible number of values. For example, there are only a certain types of search criteria within the criteria field 412. In another example, a field device associated with I/O cards may include a drop down box with the names of I/O cards (e.g., the I/O device 118) included within the process control environment 100.

By entering text and/or selecting information within the fields 406-418, a user specifies search parameters that the search engine 224 uses to search the search index database 122 for matching indexed process control information. The renderer 223 may use display context information associated with the fields 406-418 and/or selected categories within the search category bar 306 to determine a template for a graphical representation of the search results. Further, the renderer 223 may determine that the search parameters from the fields 406 and 418 are transmitted from the application 300 and generate the corresponding graphical representation of the search results shown within the search results panel 312.

The example in FIG. 4 also shows that a user selected the Area_40_FCCU Overview search result as indicated by the selection indicator 314. The search interface 102 determines that the process control information associated with the Area_40_FCCU Overview search result has a data type corresponding to a microchart. In response to selecting the Area_40_FCCU Overview search result, the search interface 102 generates a graphical representation 422 of process control information linked to the Area_40_FCCU Overview search result. The search interface then displays the graphical representation 422 as the microchart within the preview panel 316. In this example, the graphical representation 422 shows events that occurred and an operational progress of the Area_40_FCCU.

Figure 5:
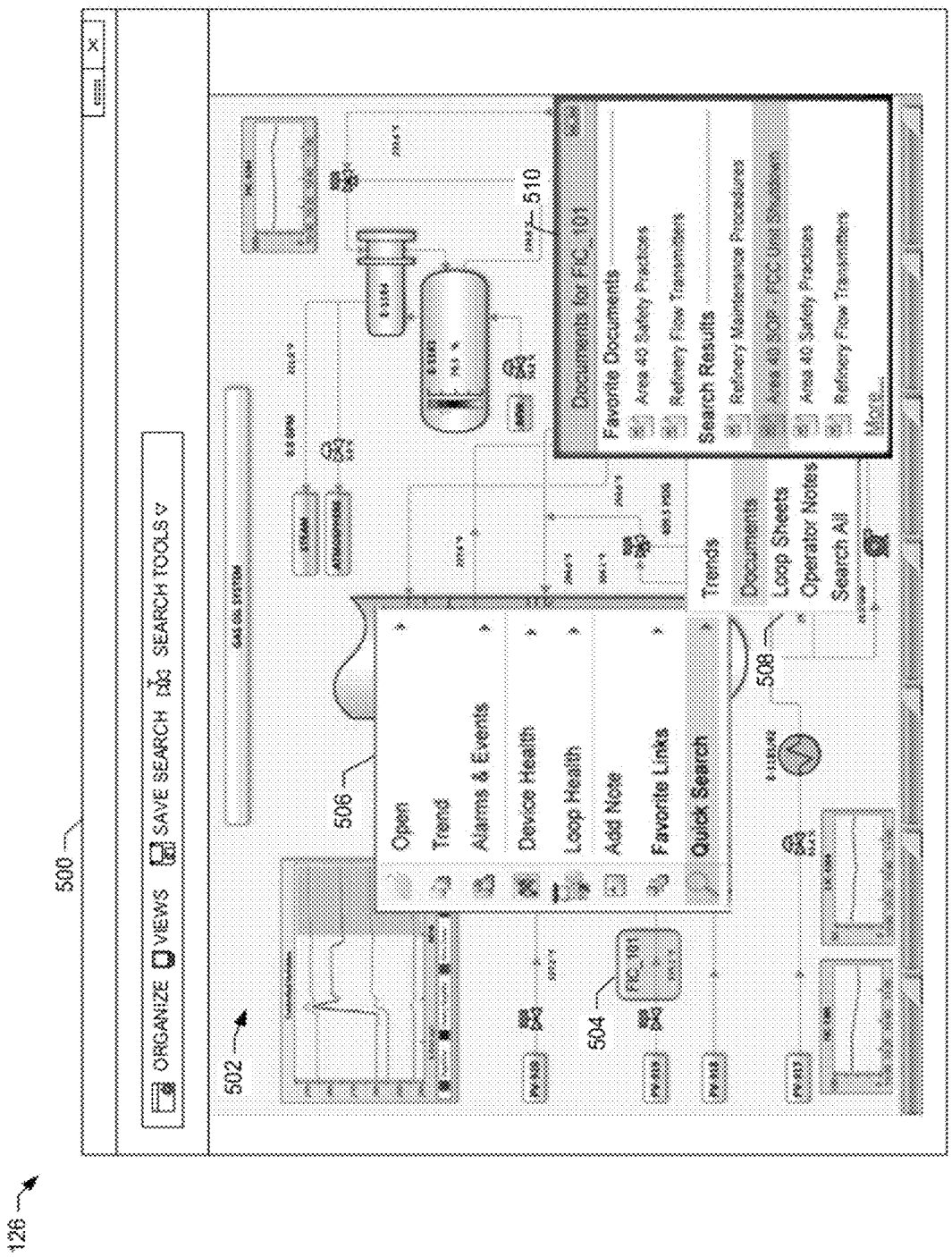
FIG. 5 shows the example user interface of FIG. 1 displaying in-context search results provided by the example search interface of FIGS. 1 and 2.

FIG. 5 shows the example user interface 126 of FIG. 1 displaying in-context search results provided by the example search interface 102 of FIGS. 1 and 2. The user interface 126 includes an operator control application 500 that includes a control panel 502. A user may use the control panel 502 to view conditions, events, values, trends, and/or alarms associated with the process control system 104. In this example, a user performs an in-context search by selecting a field device graphical representation 504 that opens a function box 506. A user performs a search associated with the FIC_101 field device 504 by then selecting the Quick Search option within the function box 506. Selecting the Quick Search function opens a second function box 508 that displays categories and/or types of search parameters. In this example, the user selects the Documents search parameter within the second function box 508.

In other examples, a user may search for process control information associated with any of the other field devices, alarms, events, graphs, values, and/or control parameters shown within the control panel 502. The user may also select multiple devices, alarms, events, graphs, values, and/or control parameters shown within the control panel 502 to perform a search using the multiple selections as search parameters. For example, a selection of the FIC_101 field device 504 and an adjacent PV-919 control parameter causes the search interface 102 to perform a search using the corresponding search parameters.

The example user interface 126 sends the name and/or an identifier associated with the FIC_101 field device 504 and the Document data type as search parameters to the search interface 102. Additionally, the user interface 126 transmits in-context information that indicates the search was initiated from the application 500 and/or initiated from the control panel 502. The renderer 223 uses this in-context information as display context information to generate a search results box 510 to display search results. In this example, because the display context information indicates the search is for the FIC_101 field device 504 and was initiated from the control panel 502, the search results are displayed within a partitioned search results box instead of a search results panel (e.g., the search results panel 312 of FIGS. 3 and 4). Further, the search engine 224 may use the in-context information to search for source information that corresponds to the FIC_101 field device 504 and/or the control panel 502.

In the illustrated example, the search interface 102 returns search results corresponding to documents that are associated with the FIC_101 field device 504. These search results are shown within the search results box 510. The search interface 102 may display the Area_40 Safety Practices document and the Refinery Flow Transmitters document within the Favorite Documents section based on metadata included within the documents. The metadata may indicate that these documents are favorites associated with the FIC_101 field device 504. The favorite metadata may be added to the documents by a user of the workstation 106 and/or other process control personnel.

The search results within the search results box 510 may be ordered based on a relevancy match to the search parameters. In other examples, the search results may be listed based on a relevancy of a role and/or job function of a user and/or based on a relevancy to the operator application 500 and/or the control panel 502. A user may select any of the search results within the search results box 510 causing the search interface to use a link associated with the selected search result to access the document within the source information database 124. The search interface 102 may also render the document in a word processing application.

Alternatively, a user may select any of the search results to perform an in-context search using the selected search result as a search parameter. In the example of FIG. 5, the user may select to perform an in-context to search for other field devices within the control panel 502 that reference the Area_40 SOP—FCC Unit Shutdown document. The search interface 102 may use the name of the document as a search parameter in addition to any additional indexed process control information associated with the displayed Area_40 SOP—FCC Unit Shutdown search result, in-context information associated with the application 500, in-context information associated with the field device 504, and/or in-context information associated with the control panel 502.

Figure 6:
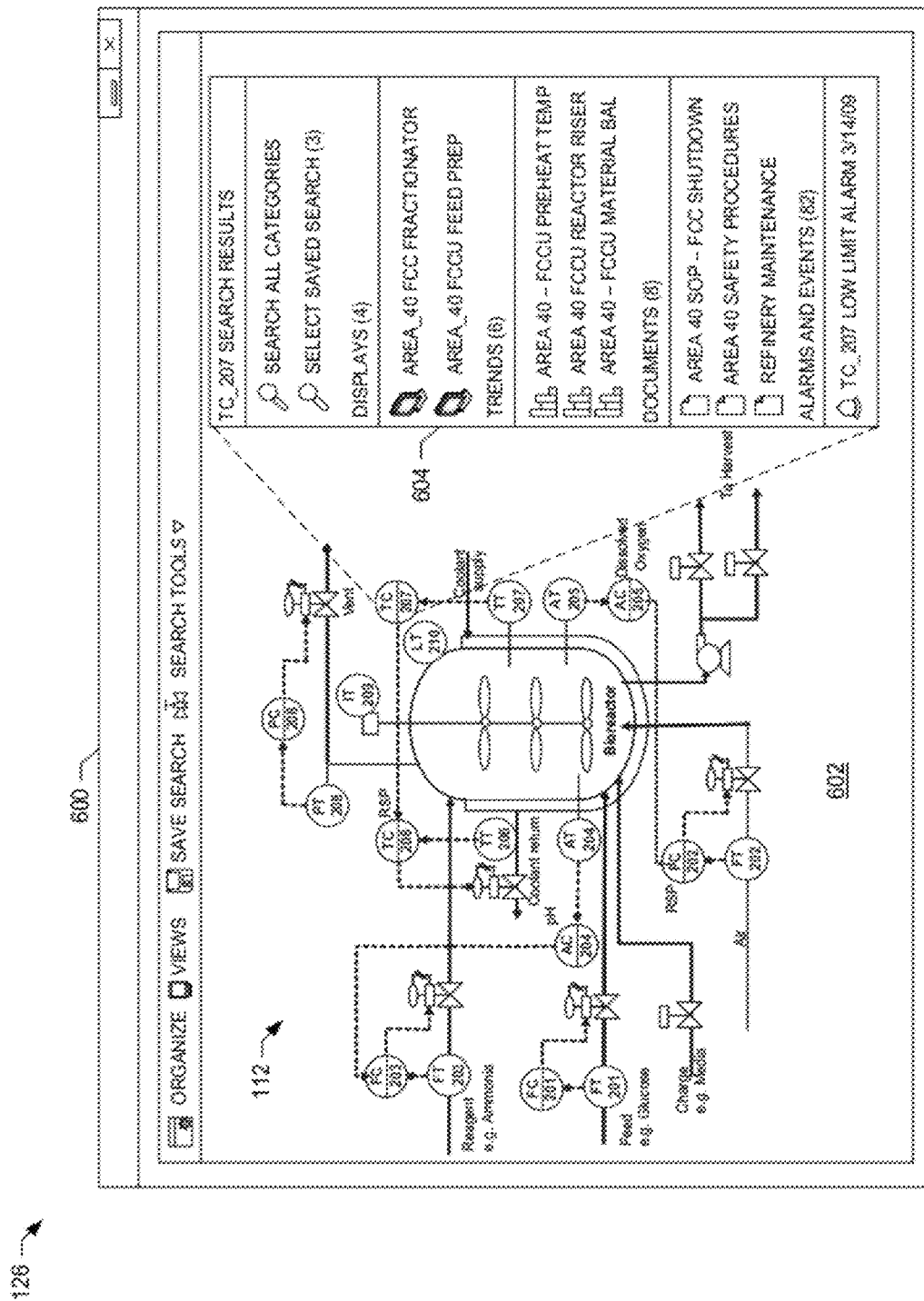
FIGS. 6 and 7 show the example user interface of FIG. 1 displaying in-context search results based on a type of user.
Figure 7:
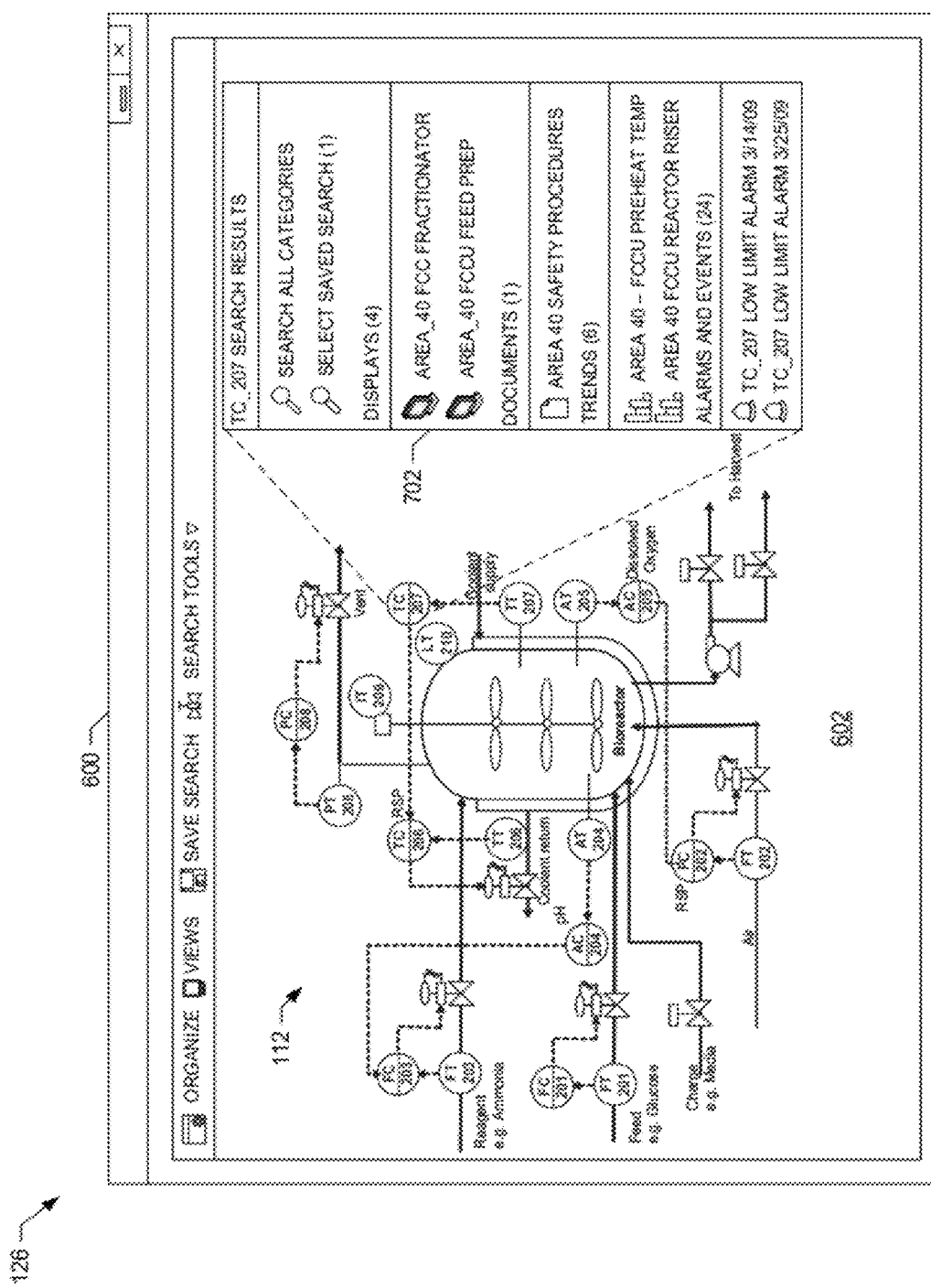

FIGS. 6 and 7 show the example user interface 126 of FIG. 1 displaying in-context search results based on a type of user. The example user interface 126 displays an enterprise application 600 with a schematic panel 602. The schematic panel 602 shows a graphical representation of the field devices 112 of FIG. 1. The field devices 112 are labeled with identifiers (e.g., Vent) and control parameters (e.g., TC 207) that are inputs and/or outputs to the field devices 112. For example, the control parameters PT 208 and PC 208 are inputs to the communicatively coupled Vent. In other examples, runtime data associated with the field devices 112 displayed within the schematic panel 602 may be shown.

In FIG. 6, a user such as, for example, a process engineer performs an in-context search for process control information associated with a TC 207 control parameter. The engineer may perform the in-context search by right-clicking on a mouse and/or other user input device to open a function box and selecting a search function. In response to the search function, the application 600 via the user interface 126 transmits search parameters to the search interface 102. The search parameters include a type of the application 600, in-context information associated with the schematic panel 602, and an identifier of the TC 207 control parameter. The search interface 102 performs a search of the search index database 122 for matching indexed process control information. The search interface 102 also renders the matching indexed process control information as search results displayed within a search results box 604. The search interface 102 renders the search results within the search results box 604 based on the in-context information indicating the search was initiated from the engineer selecting the TC 207 control parameter and based on the in context information indicating the search was initiated from the schematic panel 602.

The example search interface 102 of the illustrated example also filters the search results based on a filter condition associated with the engineer that initiated the search. The search results box 604 shows search results that are relevant and/or authorized to be viewed by the engineer. Additionally, the search results box 604 shows that the search interface 102 requested the search results based on categories and/or types of the process control information. For example, search results associated with a display type are grouped together, search results associated with trend type information are grouped together, and search results associated with document type information are grouped together. Because there are more search results than available space within the search results box 604, the search interface 102 displays the most relevant search results for each category and shows a number of total documents within each category. The engineer may view the other search results in each category by selecting the category name (e.g., Displays (4)).

FIG. 7 shows the enterprise application 600 and the field devices 112 graphically displayed within the schematic panel 602. In this illustrated example, a user such as, for example, a process operator performs an in-context search of the TC 207 control parameter. The results of the search by the search interface 102 are displayed within a search results box 702. Because the type of user in FIG. 7 is different from the type of user in FIG. 6, the search results displayed within the search results box 702 are different from the search results displayed within the search results box 604 of FIG. 6. More specifically, the process engineer in FIG. 6 is able to view more search results than the process operator in FIG. 7.

In the example of FIG. 7, because the user type is a process operator, for example, the search interface 102 (e.g., via the search filter 230) removes search results of process control information that a process operator is not authorized to view and/or that are not relevant to a process operator. For example, the search results associated with some of the documents that are displayed within the search results box 604 of FIG. 6 are not displayed within the search results box 702 of FIG. 7. In this example, process control management may decide that process operators are not authorized to view some process documents.

Figure 8:
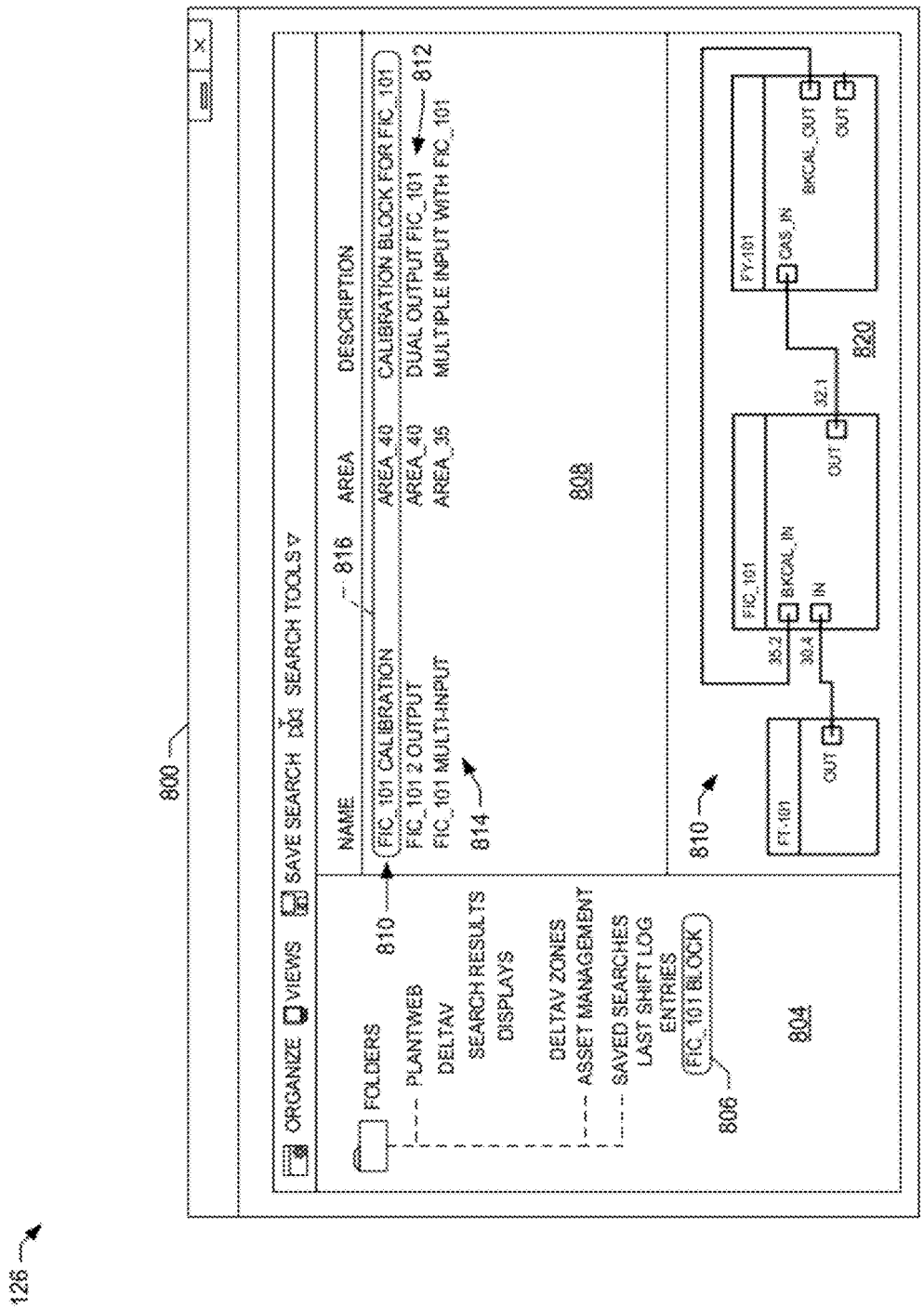
FIG. 8 shows the example user interface of FIG. 1 displaying functional block search results provided by the example search interface of FIGS. 1 and 2.

FIG. 8 shows the example user interface 126 of FIG. 1 displaying functional block search results provided by the example search interface 102 of FIGS. 1 and 2. The example user interface 126 shows an enterprise application 800 that is utilized to display process control information. In this example, a user selects to display search results associated with search criteria stored within the search results database 228 of FIG. 2. A folder panel 804 shows the user navigated through a file directory to select FIC_101 Block search criteria (e.g., search parameters), as indicated by a selection indicator 806. The FIC_101 Block is the name and/or identifier of the search criteria. In other examples, the folder panel 804 may include additional stored search results.

Upon the user selecting the FIC_101 block search criteria, the search interface 102 (e.g., via the saved search manager 226) retrieves the search criteria from the search results database 228, performs a search (e.g., via the search engine 224) for source information and/or process control information, renders (e.g., via the renderer 223) search results based on a data type of the indexed process control information, and displays the search results within a search results panel 808. In other examples, the search interface 102 may store the search results shown within the search results panel 808. A user may also print the search results displayed within the search results panel 808.

In examples where a user configures stored search criteria to be displayed in a particular manner (e.g., in a graphical schematic format), the search interface 102 displays search results associated with the stored search criteria in the format originally configured by the user. Further, in some examples, the search interface 102 may make stored search criteria available to other workstations. In this manner, users may access stored search criteria on any workstation. Additionally or alternatively, the search interface 102 may store search criteria and/or search parameters to a global database that is accessible by any workstation within the process control environment 100. By storing search criteria globally within the process control environment 100, any user may access any stored search criteria and/or search results.

The search results associated with the stored search criteria displayed within the search results panel 808 include a list of function block diagrams including a first functional block 810, a second functional block 812, and a third functional block 814. The listed functional blocks 810-814 includes a name of the function block (e.g., Name), a location (e.g., Area) within the process control environment 100 of the function block, and a description (e.g., Description) of the function block. Additionally, each of the functional blocks 810-814 includes a FIC_101 functional block corresponding to a FIC_101 search parameter. In this example, the renderer 223 of FIG. 2 displays the search results as a list based on a functional block file type of the search results. In other examples, a user may specify to view the functional block search results as diagrams of the functional blocks 810-814. The illustrated example shows that a user selected to preview the functional block 810, which is indicated by a selection indicator 816.

A preview panel 820 shows the functional block 810 with runtime data at the inputs and outputs corresponding to control parameters. For example, the FIC_101 function block includes BKCAL_IN, IN and OUT control parameters. When a user selects to preview the functional block 810, the search interface 102 accesses the runtime data memory 120 and/or the search index database 122 for runtime data associated with the control parameters of the FIC_101 functional block. The example search interface 102 then renders (e.g., via the renderer 223) the functional block 810 for display within the preview panel 820 by including the runtime data. As the runtime data associated with the BKCAL_IN, IN and OUT control parameters changes within the controller 108 of FIGS. 1 and 2, the search interface 102 updates the runtime data displayed within the preview panel 820.

A user may select to open a functional block application by selecting the functional block 810 within the preview panel 820. Selecting the functional block 810 causes the search interface 102 to use a link within the search result of the functional block 810 to retrieve process control information associated with the functional block 810, open the functional block application, and display the functional block 810 within the functional block application. A user may then modify and/or view additional information associated with the function block 810.

Flowcharts representative of example processes 900, 1000, and 1100 for implementing the search interface 102 and the index manager 103 of FIGS. 1-2 are shown in FIGS. 9A, 9B, 10, 11A, and 11B. In this example, the processes 900, 1000, and 1100 may be implemented using the machine readable instructions in the form of a program for execution by a processor such as the processor P12 shown in the example processor system P10 discussed below in connection with FIG. 12. The program may be embodied in software stored on a computer readable medium such as a CD-ROM, a floppy disk, a hard drive, a digital versatile disk (DVD), or a memory associated with the processor P12, but the entire program and/or parts thereof could alternatively be executed by a device other than the processor P12 and/or embodied in firmware or dedicated hardware. Further, although the example program is described with reference to the flowcharts illustrated in FIGS. 9A, 9B, 10, 11A, and 11B, many other methods of implementing the example search interface 102 and the example index manager 103 may alternatively be used. For example, the order of execution of the blocks may be changed, and/or some of the blocks described may be changed, eliminated, or combined.

As mentioned above, the example processes of FIGS. 9A, 9B, 10, 11A, and 11B may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 9A, 9B, 10, 11A, and 11B may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporary buffering, and/or for caching of the information). As used herein, the term non-transitory computer readable medium is expressly defined to include any type of computer readable medium and to exclude propagating signals.

Figure 9A:
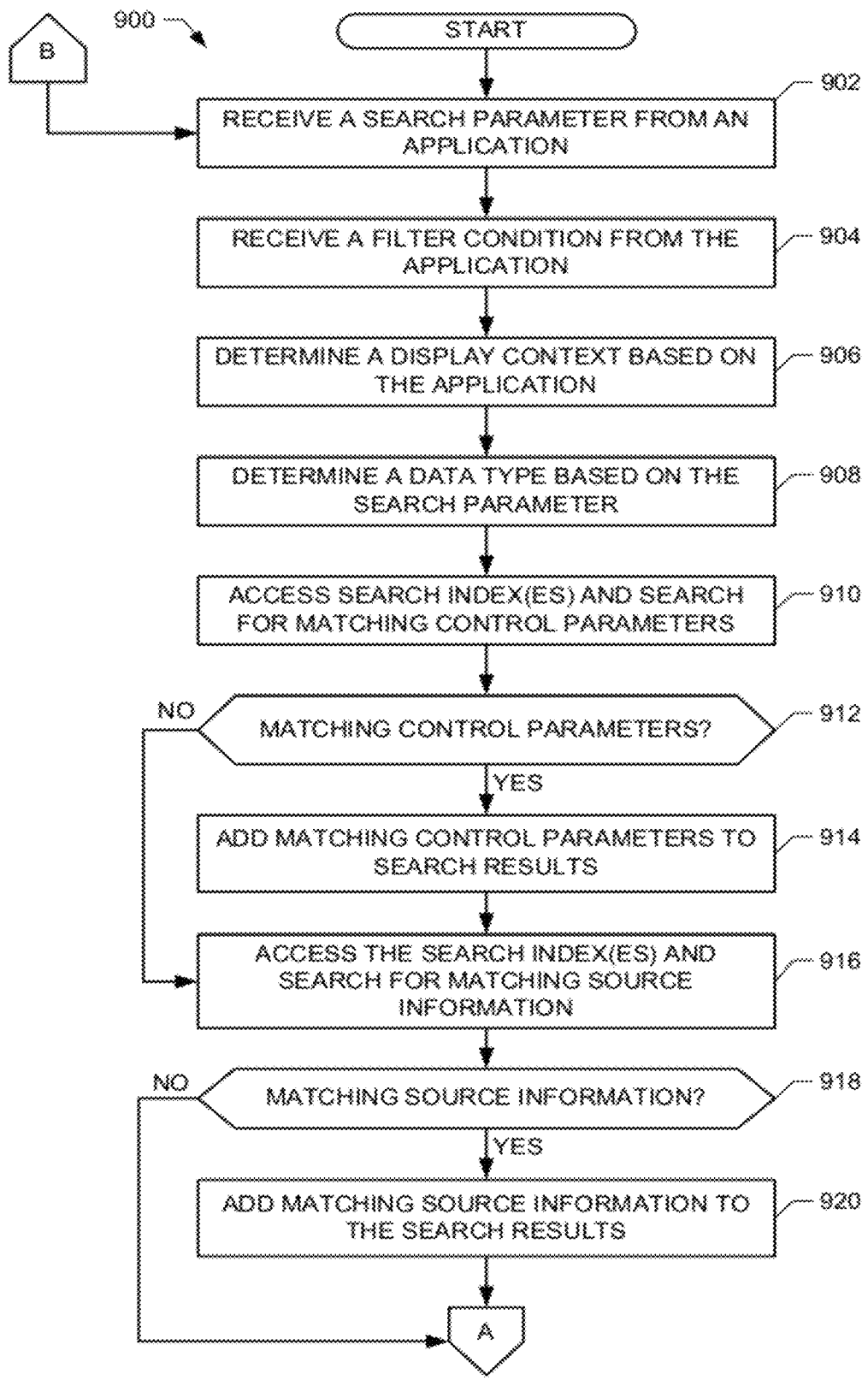
FIGS. 9A, 9B, 10, 11A, and 11B are flowcharts of example methods that may be used to implement the search interface and/or the index manager of FIGS. 1 and/or 2.
Figure 9B:
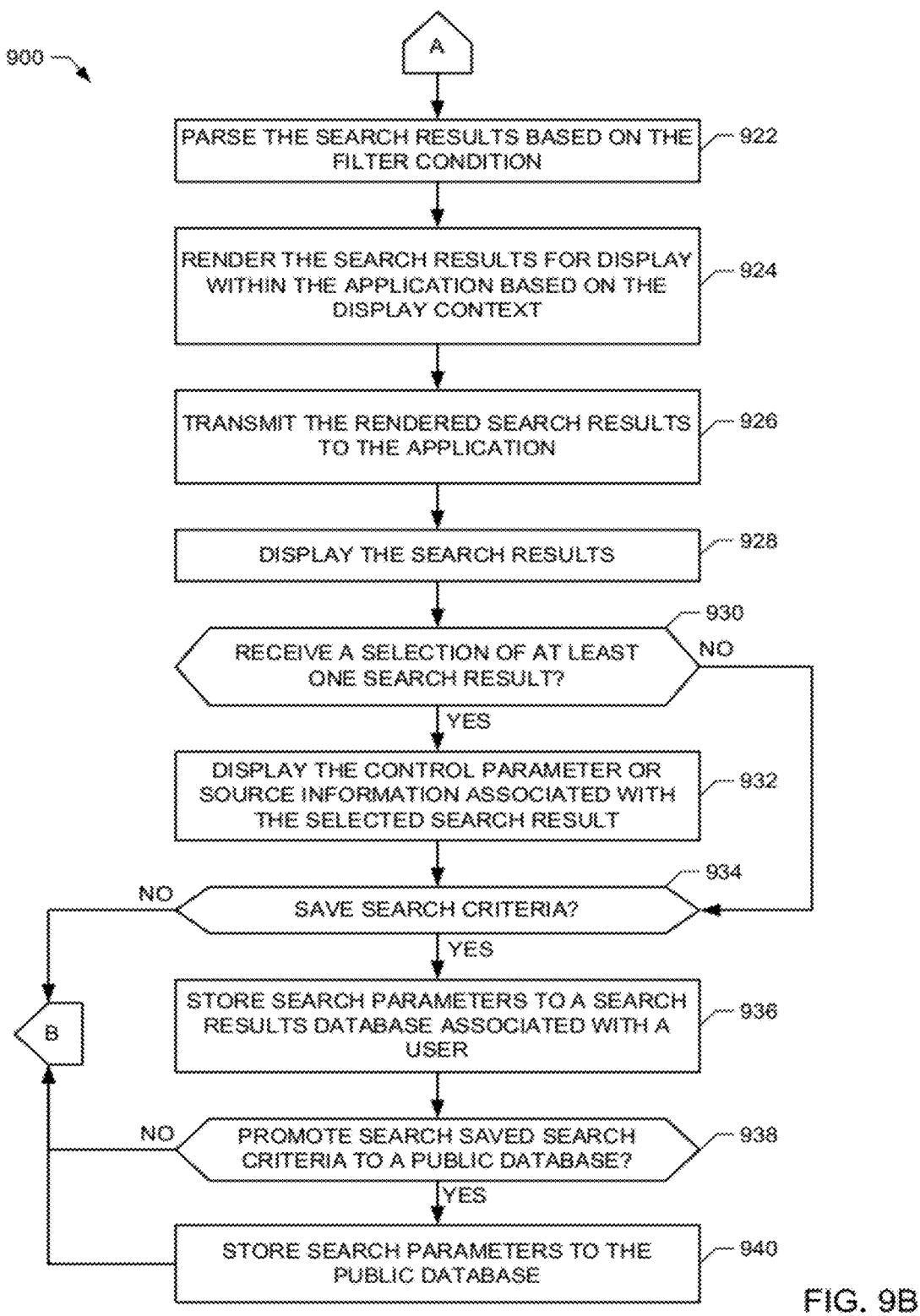

The example process 900 of FIGS. 9A and 9B displays search results based on at least one search parameter provided by a user. The example process 900 of FIG. 9A begins by receiving the at least one search parameter from an application operating within the user interface 126 (e.g., via application interface 220 of FIG. 2) (block 902). The example process 900 then receives a filter condition from the application (e.g., via application interface 220 of FIG. 2) (block 904). In some examples, the filter condition may be sent prior to and/or with the at least one search parameter. The example process 900 next determines a display context based on the search parameters and/or based on the application that transmitted the search parameters (e.g., via the processor 222) (block 906). The display context may also be determined based on any in-context information transmitted by the application and/or the under interface 126.

The example process 900 further determines at least one data type and/or category of process control information based on the at least one search parameter (e.g., via the processor 222) (block 908). The example process 900 then accesses the search index database 122 and searches at least one index for control parameters that match the at least one search parameter (e.g., via the search engine 224) (block 910). The example process 900 determines if there is at least one matching control parameter (e.g., via the search engine 224) (block 912). If at least one control parameter matches the at least one search parameter, the example process 900 adds the at least one control parameter and/or corresponding runtime data to a list of search results (e.g., via the search engine 224) (block 914). The example process 900 then accesses the search index database 122 and searches index(es) for source information that match the at least one search parameter (e.g., via the search engine 224) (block 916). Additionally, if at least one control parameter does not match the at least one search parameter (block 912), the example process 900 accesses the search index database 122 and searches index(es) for source information (block 916).

The example process 900 of the illustrated example then determines if any indexed source information matches the at least one search parameter (e.g., via the search engine 224) (block 918). If the example process 900 determines there is a match to indexed source information, the example process 900 adds the matching source information to the search results (e.g., via the search engine 224) (block 920). In other examples, the process 900 may search for source information and runtime data via control parameters concurrently. Additionally, if the example process 900 does not find any source information and/or control parameters that match the at least one search parameter, the example process 900 may return a search error message to a user that initiated the search.

The example process 900 of FIG. 9B continues by parsing (e.g., filtering and/or removing) items (e.g., individual search results) from the search results based on the filter condition (e.g., via the search filter 230) (block 922). The process 900 parses items by determining which of the items are not relevant and/or authorized to be viewed by a user that initiated the search. The example process 900 then renders the search results for display within the application based on the display context determined in block 906 (e.g., via the renderer 223) (block 924). In some examples, the process 900 may also cache the search results to determine if any changes occurred to the displayed search results (e.g., via the display data manager 232).

The example process 900 then transmits the rendered search results to the user interface 126 for display within the application (e.g., via the application interface 220) (block 926). The example process 900 displays the search results within the application (e.g., via the user interface 126) (block 928). The example process 900 next determines if at least one of the displayed search results is selected by a user (e.g., via the application interface 220) (block 930). If a selection of at least one search result is received, the example process 900 uses a link within the selected search result to access the source information database 124 and/or the runtime data memory 120 for runtime data corresponding to control parameters and/or source information (e.g., via the display data manager 232) (block 932). The example process 900 then displays the runtime data and/or the source information associated with the selected search result within a preview panel of the application (e.g., via the renderer 223) (block 932). In other examples, the process 900 may display the runtime data and/or the source information within a different application associated with a type of the runtime data and/or the source information.

The example process 900 of FIG. 9B continues by determining if a user has selected to store the search criteria and/or search results (e.g., via the saved search manager 226) (block 934). Also, if the example process determines that a user has not selected to preview at least one search result (block 930), the example process 900 determines if the user has selected to store the search criteria (block 934). If the example process 900 determines that a user has not selected to store the search criteria (block 934), the example process 900 of FIG. 9A receives at least one new search parameter to conduct a new search (block 902). In other examples, the process 900 may terminate if the user closes the application with the displayed search results.

If the example process 900 determines that a user has selected to store the search criteria, the process 900 stores the search parameters and/or search results to the search results database 228 (e.g., via the saved search manager 226) (block 936). The example process 900 then determines if the stored search criteria should be promoted to a public search results database (e.g., via the saved search manager 226) (block 938). The public search results database includes a database accessible to any user within the process control environment 100. The example process 900 determines if the search criteria should be promoted based on a frequency that a user accesses the search results, a scope of the search results, and/or a time period. For example, the process 900 may daily promote stored search criteria to the public database.

If the example process 900 is not to promote the search criteria, the process 900 returns to receiving at least one new search parameter to conduct a new search (block 902). However, if the example process 900 is to store the search criteria to the public search results database, the example process 900 stores the search criteria including the at least one search parameter to the public result database (e.g., via the save search manager 226 (block 940). The example process 900 then returns to receiving at least one new search parameter to conduct a new search (block 902). In other examples, the process 900 may terminate if the user closes the application with the displayed search results.

Figure 10:
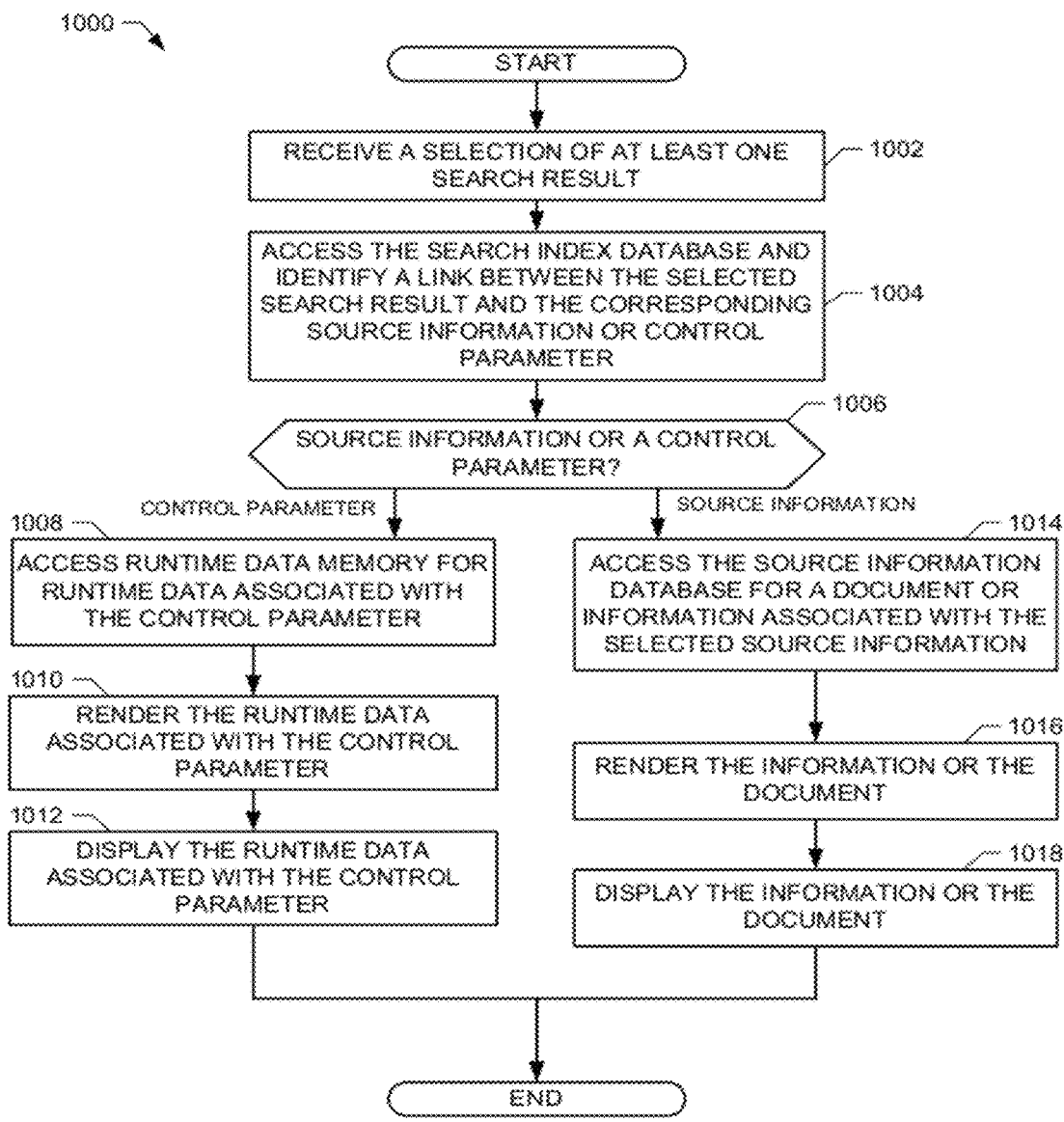

The example process 1000 of FIG. 10 renders process control information upon a user selecting a corresponding search result. For example, the process 1000 may be executed when the example process 900 of FIGS. 9A and 9B executes block 932. The example process 1000 begins by receiving a selection of at least one search result by a user (e.g., via the application interface 220) (block 1002). The example process 1000 then access the search index database 122 and identifies a link between the selected search result and corresponding source information within the source information database 124 and/or runtime data associated with one or more control parameters within the runtime data memory 120 (e.g., via the display data manager 232) (block 1004). In other examples, the link to the stored process control information may be included within the selected search result.

The example process 1000 next determines if the selected search result is associated with source information and/or a control parameter (e.g., via the display data manager 232) (block 1006). If the selected search result is associated with at least one control parameter, the example process 1000 accesses the runtime data memory 120 for runtime data associated with the at least one control parameter (e.g., via the display data manager 232) (block 1008). In other examples, the process 1000 accesses the search index database 122 for indexed runtime data associated with the at least one control parameter. The example process 1000 of the illustrated example then renders the runtime data associated with the at least one control parameter (e.g., via the renderer 223) (block 1010). Rendering the runtime data may include selecting a template (e.g., a chart, a graph, a data field, etc.) to display the runtime data and/or opening an application to display the runtime data. The example process 1000 then displays the rendered runtime data in a preview pane of an application from which the search was initiated (e.g., via the user interface 126) (block 1012). In other examples, the process 1000 may open a separate application to display the runtime data. The example process 1000 may then terminate. Alternatively, the example process 1000 may return to receiving a selection of another search result (block 1002).

If the example process 1000 determines that the selected search result is associated with source information (block 1006), the process 1000 accesses the source information database 124 for a document and/or information associated with the selected search result (e.g., via the display data manager 232) (block 1014). In some examples, the selected search result may include both source information and at least one control parameter. In these examples, the process 1000 executes blocks 1008-1012 for the control parameter(s) while executing blocks 1014-1018 for the source information. The example process 1000 next renders the document and/or information (e.g., via the renderer 223) (block 1016). Rendering the document and/or information may include opening an application to display the document and/or information. The application may be opened within a preview panel and/or as a separate application within the user interface 126. The example process 1000 then displays the rendered document and/or information (e.g., via the user interface 126) (block 1018). The example process 1000 may then terminate. Alternatively, the example process 1000 may return to receiving a selection of another search result (block 1002).

Figure 11A:
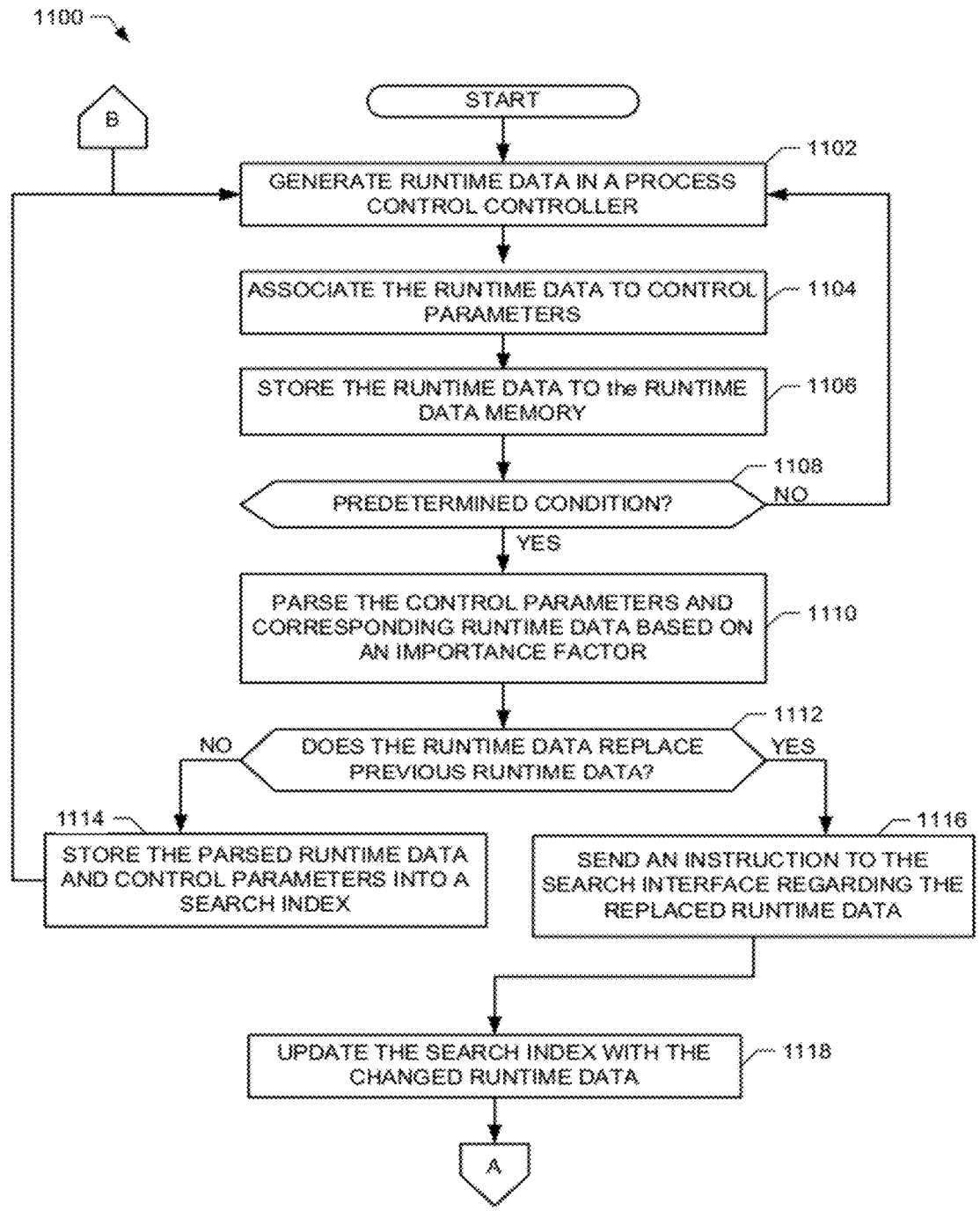
Figure 11B:
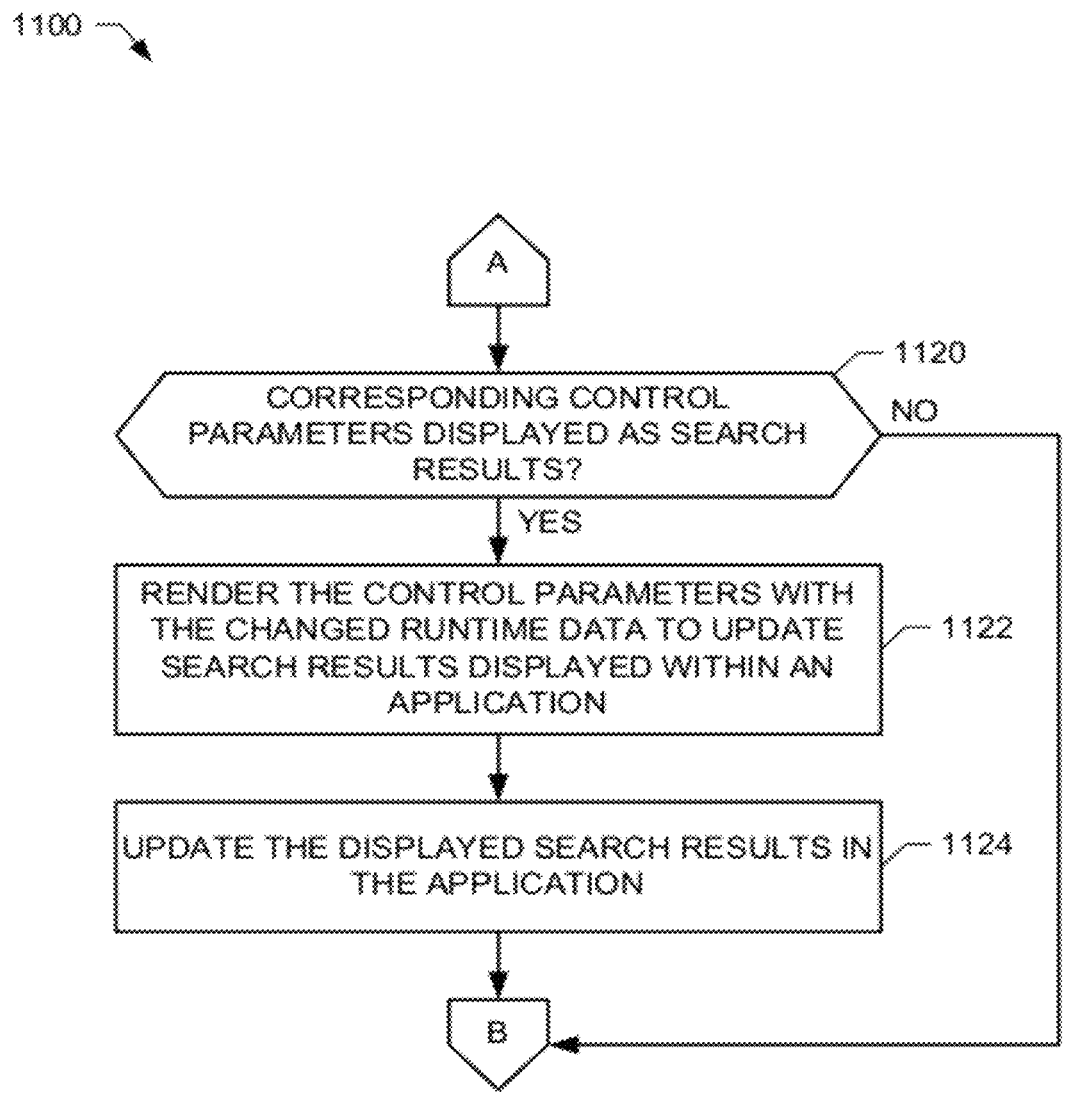

The example process 1100 of FIGS. 11A and 11B indexes runtime data generated by the controller 108 of FIGS. 1 and 2. The example process 1100 begins by generating runtime data (e.g., via the controller 108) (block 1102). The example process 1100 then associates the runtime data to control parameters (e.g., via the controller 108) (block 1104). The example process 1100 also stores the runtime data to the runtime data memory 120 (e.g., via the index manager 103) (block 1106). The example process 1100 next determines if a predetermined condition exists to index the runtime data (e.g., via the runtime data receiver 202) (block 1108). The predetermined condition may include receiving the runtime data and associated control parameters from the controller 108. The predetermined condition may also include, for example, periodically accessing the controller 108 and/or the runtime data memory 120 to access the runtime data. If the predetermined condition is not satisfied, the example process 1100 returns to generating runtime data (block 1102). In some examples, the process 1100 generates runtime data, associates control parameters with the runtime data, and stores the runtime data (blocks 1102-1106) concurrently while executing the other functional blocks shown within FIGS. 11A and 11B.

If the predetermined condition is satisfied (block 1108), the example process 1100 parses the control parameters associated with the runtime data based on an importance factor (e.g., via the data parser 204) (block 1110). The example process 1100 parses the control parameters based on, for example, an importance factor by removing and/or not indexing control parameters that do not meet the conditions specified by the importance factor. For example, an importance factor may include control parameters that are relevant to display process control information. Control parameters that are not relevant to display process control information may be disregarded and/or removed by the example process 1100. In other examples, an importance factor may include control parameters that are frequently accessed by users.

The example process 1100 of the illustrated example then determines if the runtime data replaces previously indexed runtime data (e.g., via the data manager 206) (block 1112). In some examples, the previously indexed runtime data may be displayed. If the runtime data does not replace previously indexed runtime data, the example process 1100 creates an index entry for the runtime data using the corresponding control parameter, stores the runtime data to the index entry, and stores the index entry to an index within the search index database 122 (e.g., via the data manager 206) (block 1114). Because this is the first instance of the particular index runtime data being stored (e.g., a first instance of indexing a control parameter), the example process 1100 does not need to determine if the control parameter is displayed within search results. Thus, the example process 1100 returns to generating runtime data (block 1102).

However, if the runtime data replaces previously indexed runtime data, indicating that the corresponding control parameters were already indexed, the example process 1100 sends an instruction to the search interface 102 (e.g., the data display manager 232) to indicate runtime data has been replaced and/or changed (e.g., via the data manager 206) (block 1116). In other examples, the search interface 102 may access the search index database 122 to determine if runtime data has changed. The example process 1100 then updates the search index database 122 with the changed runtime data (e.g., via the data manager 206) (block 1118).

The example process 1100 of FIG. 11B continues by determining if control parameters are displayed as search results within the user interface 126 (e.g., via the display data manager 232) (block 1120). If the control parameters associated with the changed runtime data are not displayed as search results, the example process 1100 returns to generating runtime data (block 1102). However, if the control parameters are displayed as search results, the example process 1100 renders the control parameters with the changed runtime data to update the search results displayed within an application shown by the user interface 126 (e.g., via the renderer 223) (block 1122). The example process 1100 then updates the displayed search results in the application (e.g., via the renderer 223 and/or the application interface 220) (block 1124). The example process 1100 then returns to generating runtime data (block 1102).

Figure 12:
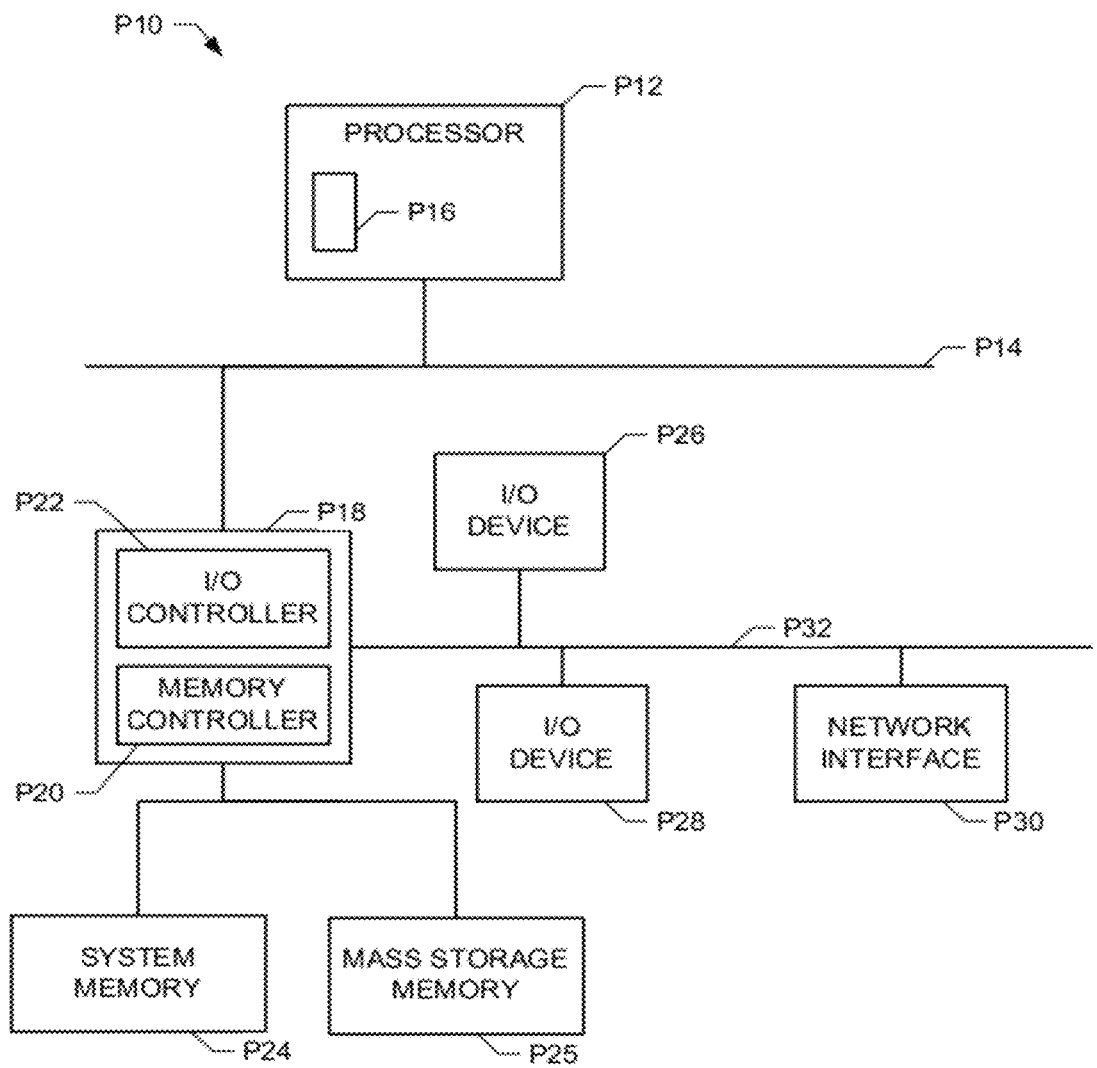
FIG. 12 is a block diagram of an example processor system that may be used to implement the example methods and apparatus described herein.

FIG. 12 is a block diagram of an example processor system P10 that may be used to implement the example methods and apparatus described herein. For example, processor systems similar or identical to the example processor system P10 may be used to implement the example runtime data receiver 202, the example data parser 204, the example data manager 206, the example source information manager 208, the example runtime data memory 120, the example search index database 122, the example source information database 124, the example application interface 220, the example processor 222, the example renderer 223, the example search engine 224, the example saved search manager 226, the example search results database 228, the example search filter 230, the example display data manager 232, the example workstation interface 234, and/or more generally, the example search interface 102 and/or the index manager 103 of FIGS. 1 and/or 2. Although the example processor system P10 is described below as including a plurality of peripherals, interfaces, chips, memories, etc., one or more of those elements may be omitted from other example processor systems used to implement one or more of the example runtime data receiver 202, the example data parser 204, the example data manager 206, the example source information manager 208, the example runtime data memory 120, the example search index database 122, the example source information database 124, the example application interface 220, the example processor 222, the example renderer 223, the example search engine 224, the example saved search manager 226, the example search results database 228, the example search filter 230, the example display data manager 232, the example workstation interface 234, and/or more generally, the example search interface 102 and/or the index manager 103.

As shown in FIG. 12, the processor system P10 includes a processor P12 that is coupled to an interconnection bus P14. The processor P12 includes a register set or register space P16, which is depicted in FIG. 12 as being entirely on-chip, but which could alternatively be located entirely or partially off-chip and directly coupled to the processor P12 via dedicated electrical connections and/or via the interconnection bus P14. The processor P12 may be any suitable processor, processing unit or microprocessor. Although not shown in FIG. 12, the system P10 may be a multi-processor system and, thus, may include one or more additional processors that are identical or similar to the processor P12 and that are communicatively coupled to the interconnection bus P14.

The processor P12 of FIG. 12 is coupled to a chipset P18, which includes a memory controller P20 and a peripheral input/output (I/O) controller P22. As is well known, a chipset typically provides I/O and memory management functions as well as a plurality of general purpose and/or special purpose registers, timers, etc. that are accessible or used by one or more processors coupled to the chipset P18. The memory controller P20 performs functions that enable the processor P12 (or processors if there are multiple processors) to access a system memory P24 and a mass storage memory P25.

The system memory P24 may include any desired type of volatile and/or non-volatile memory such as, for example, static random access memory (SRAM), dynamic random access memory (DRAM), flash memory, read-only memory (ROM), etc. The mass storage memory P25 may include any desired type of mass storage device. For example, if the example processor system P10 is used to implement the language file database 206 and/or the resource memory 119 (FIG. 2), the mass storage memory P25 may include a hard disk drive, an optical drive, a tape storage device, etc. Alternatively, if the example processor system P10 is used to implement the runtime data memory 120, the search index database 122, source information database 124, and/or the search results database 228, the mass storage memory P25 may include a solid-state memory (e.g., a flash memory, a RAM memory, etc.), a magnetic memory (e.g., a hard drive), or any other memory suitable for mass storage in the runtime data memory 120, the search index database 122, source information database 124, and/or the search results database 228.

The peripheral I/O controller P22 performs functions that enable the processor P12 to communicate with peripheral input/output (I/O) devices P26 and P28 and a network interface P30 via a peripheral I/O bus P32. The I/O devices P26 and P28 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface P30 may be, for example, an Ethernet device, an asynchronous transfer mode (ATM) device, an 802.11 device, a DSL modem, a cable modem, a cellular modem, etc. that enables the processor system P10 to communicate with another processor system.

While the memory controller P20 and the I/O controller P22 are depicted in FIG. 12 as separate functional blocks within the chipset P18, the functions performed by these blocks may be integrated within a single semiconductor circuit or may be implemented using two or more separate integrated circuits.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto. On the contrary, this patent covers all methods, systems, and machine-accessible medium fairly falling within the scope of the appended claims either literally or under the doctrine of equivalents.

What is claimed is:

1. A method to display process control search results, the method comprising:
    retrieving, by executing an instruction with a processor, a search parameter via an application or a control panel, the search parameter having a different respective format associated with the application and the control panel;
    searching, by executing an instruction with the processor, a search index for control parameters that match the search parameter to form a set of matched control parameters, wherein the search index includes control parameters that correspond to first runtime data generated by a controller within a process control system, the set of matched control parameters corresponding to the first runtime data;
    rendering, by executing an instruction with the processor, the set of matched control parameters for display as the search results via a first or a second result panel, the rendering based on whether the search parameter originated from the application or the control panel;
    identifying, by executing an instruction with the processor, second runtime data generated by the controller;
    determining, by executing an instruction with the processor, whether the second runtime data replaces the first runtime data in the search index or whether control parameters of the second runtime data are to be indexed in the search index;
    when the second runtime data replaces the first runtime data, updating, by executing an instruction with the processor, the search results for display; and
    when the control parameters of the second runtime data are to be indexed in the search index, reducing a number of queries performed by the processor by:
        refraining from determining whether the control parameters of the second runtime data are displayed as the search results;
        storing the second runtime data in the search index; and
        maintaining the search results for display.

2. A method as defined in claim 1, further comprising transmitting the rendered control parameters to at least one of the application or the control panel for display as the search results.

3. A method as defined in claim 1, wherein a display context is based on the application or the control panel and is determined by matching the display context to at least one of a type of the application, a data type displayed via the application, or a data type of the set of matched control parameters.

4. A method as defined in claim 1, wherein the first runtime data is stored in the search index by:
    generating, via the controller, the first runtime data;
    parsing the first runtime data based on a rule set; and
    storing at least a portion of the first runtime data via the search index in response to a threshold condition by associating a value of the first runtime data with the corresponding control parameter in the search index.

5. A method as defined in claim 4, wherein the threshold condition is at least one of a threshold time, a control loop time, or a control loop event.

6. A method as defined in claim 4, wherein the rule set includes at least one of a frequency of the search parameter, an importance factor, a frequency of utilization parameter, or a frequency of usage in a process control system factor.

7. A method as defined in claim 1, further comprising:
    searching the search index for source information that matches the search parameter to form matched source information; and
    rendering the matched source information for display via the application as the search results based on the application or the control panel.

8. A method as defined in claim 7, wherein at least one of the set of matched control parameters or the matched source information is displayed within the search results as at least one of a diagram, a device, a variable, an input value, an output value, a process, a graph, a chart, a process control component, an alarm, an event, or a document.

9. A method as defined in claim 7, wherein the source information includes at least one of configuration information, historical archive information, alarm information, event information, or process control help documents.

10. A method as defined in claim 1, further comprising:
applying a filter condition associated with a user via the application;
parsing the set of matched control parameters based on the filter condition; and
rendering the control parameters parsed from the set of matched control parameters for display via the application or the control panel as the search results.

11. A method as defined in claim 10, wherein the filter condition includes at least one of a job function of a user, a span of control associated with the user, security access of the user, privileges granted to the user, or an identifier associated with the user.

12. A method as defined in claim 1, wherein the control parameters are first control parameters and further comprising:
accessing a workstation; and
determining second control parameters utilized by at least one application on the workstation that match the search parameter.

13. A method as defined in claim 1, further comprising:
retrieving from the controller the second runtime data to replace the first runtime data;
parsing the second runtime data based on a rule set; and
storing at least a portion of the second runtime data in the search index in response to a threshold condition by replacing the first runtime data with the second runtime data.

14. A method as defined in claim 13, further comprising:
prior to replacing values of the first runtime data, determining if respective ones of the values are displayed as the search results; and
updating the displayed search results with second values by rendering the matched control parameters associated with the second values for display via the application as the search results based on an application type.

15. A method as defined in claim 1, wherein the search parameter is selected by a user selecting a graphical object displayed within the application.

16. A method as defined in claim 1, wherein the search parameter is provided by a user entering text into at least one search field.

17. An apparatus to display process control search results, the apparatus comprising a processor to implement a search engine, the search engine to:
search a search index for control parameters that match a search parameter received from an application or a control panel, the search parameter having a different respective format associated with the application and the control panel, wherein the search index includes control parameters that correspond to first runtime data generated by a controller within a process control system, the matching control parameters corresponding to the first runtime data;
transmit the matching control parameters as search results for display as the search results via a first or a second result panel based on whether the search parameter originated from the application or the control panel;
identify second runtime data generated by the controller;
determine whether the second runtime data replaces the first runtime data in the search index or whether control parameters of the second runtime data are to be indexed in the search index;
when the second runtime data replaces the first runtime data, update the search results for display; and
when the control parameters of the second runtime data are to be indexed in the search index, reduce a number of queries performed by the search engine by:
refraining from determining whether the control parameters of the second runtime data are displayed as the search results;
storing the second runtime data in the search index; and
maintaining the search results for display.

18. An apparatus as defined in claim 17, further comprising:
a data receiver to receive the first runtime data from the controller;
a data parser to parse the first runtime data based on a rule set; and
a data manager to store at least a portion of the first runtime data in the search index in response to a threshold condition by associating a value of the first runtime data with respective ones of the corresponding control parameters listed within the search index.

19. An apparatus as defined in claim 18, wherein:
the data receiver is to receive from the controller the second runtime data to replace the first runtime data;
the data parser is to parse the second runtime data based on the rule set; and
the data manager is to store at least a portion of the second runtime data in the search index in response to the threshold condition by replacing the first runtime data with the second runtime data in respective ones of the corresponding control parameters.

20. An apparatus as defined in claim 17, further comprising:
a renderer to:
determine a display context based on an at least one of the application or the control panel requesting a search; and
render the matching control parameters for display via the application as the search results based on the application or the control panel; and
an application interface to receive the search parameter from a user via the application.

21. An apparatus as defined in claim 20, wherein:
the search engine is to determine if values of the first runtime data are displayed as the search results; and
the renderer is to update the displayed search results with the second runtime data by rendering the matched control parameters associated with second values for display via the application as the search results based on an application type.

22. An apparatus as defined in claim 20, wherein the processor is to determine the display context by matching the display context to at least one of a type of the application, a data type displayed within the application, or a data type of the control parameters to be displayed as the search results.

23. An apparatus as defined in claim 20, wherein:
the search engine is to search the search index for source information that matches the search parameter; and
the renderer is to render the matched source information for display via the application as the search results based on the determined display context.

24. An apparatus as defined in claim 20, wherein the application interface is to receive a filter condition associated with a user via the application.

25. An apparatus as defined in claim 24, further comprising a search filter to filter the matched control parameters based on the filter condition.

26. An apparatus as defined in claim 24, further including a workstation interface to:
   access a workstation; and
   determine control parameters utilized by at least one application on the workstation that match the search parameter.

27. A tangible computer readable medium comprising instructions that, when executed, cause a machine to at least:
   retrieve a search parameter via an application or a control panel, the search parameter having a different respective format associated with the application and the control panel;
   search a search index for a control parameter that matches the search parameter to form a set of matched control parameters, wherein the search index includes the control parameter that corresponds to first runtime data, the set of matched control parameters corresponding to the first runtime data;
   render the set of matched control parameters for display as the search results via a first or a second result panel based on whether the search parameter originated from the application or the control panel;
   identify second runtime data generated by the controller;
   determine whether the second runtime data replaces the first runtime data in the search index or whether control parameters of the second runtime data are to be indexed in the search index;
   when the second runtime data replaces the first runtime data, update the search results for display; and
   when the control parameters of the second runtime data are to be indexed in the search index, reduce a number of queries performed by the machine by:
      refraining from determining whether the control parameters of the second runtime data are displayed as the search results;
      storing the second runtime data in the search index; and
      maintaining the search results for display.

* * * * *